(12) United States Patent
Wakabayashi et al.

(10) Patent No.: US 7,807,756 B2
(45) Date of Patent: Oct. 5, 2010

(54) CURABLE COMPOSITION

(75) Inventors: Katsuyu Wakabayashi, Settsu (JP);
Noriko Matsushita, Takasago (JP);
Toshihiko Okamoto, Takasago (JP)

(73) Assignee: Kaneka Corporation, Osaka (JP)

( * ) Notice: Subject to any disclaimer, the term of this patent is extended or adjusted under 35 U.S.C. 154(b) by 107 days.

(21) Appl. No.: 11/667,340

(22) PCT Filed: Nov. 9, 2005

(86) PCT No.: PCT/JP2005/020500

§ 371 (c)(1),
(2), (4) Date: May 9, 2007

(87) PCT Pub. No.: WO2006/051798

PCT Pub. Date: May 18, 2006

(65) Prior Publication Data

US 2007/0299214 A1    Dec. 27, 2007

(30) Foreign Application Priority Data

Nov. 10, 2004    (JP)    ............................. 2004-325955

(51) Int. Cl.
*C08F 8/30*    (2006.01)
(52) U.S. Cl. ........................ 525/374; 525/403; 525/408; 525/474; 525/479; 528/21; 502/150; 502/167; 502/170; 502/200; 502/352
(58) Field of Classification Search ................ 525/403, 525/408; 106/14.18; 502/150; 528/21
See application file for complete search history.

(56) References Cited

U.S. PATENT DOCUMENTS

| | | | | |
|---|---|---|---|---|
| 4,650,889 A | * | 3/1987 | Plueddemann | .............. 556/421 |
| 5,684,094 A | * | 11/1997 | Suzuki et al. | ................ 525/403 |
| 6,437,071 B1 | * | 8/2002 | Odaka et al. | ................... 528/15 |
| 6,642,309 B2 | * | 11/2003 | Komitsu et al. | ............. 525/100 |
| 7,351,782 B2 | * | 4/2008 | Wakabayashi et al. | ........ 528/18 |
| 2004/0198885 A1 | | 10/2004 | Okamoto et al. | |

FOREIGN PATENT DOCUMENTS

| | | | |
|---|---|---|---|
| EP | 0 326 862 | * | 9/1989 |
| EP | 0 773 231 | * | 5/1997 |
| EP | 1 445 287 A1 | | 8/2004 |
| JP | 52-73998 | | 6/1977 |
| JP | 63-6041 A | | 1/1988 |
| JP | 5-117519 A | | 5/1993 |
| JP | 8-41358 A | | 2/1996 |
| JP | 11-116686 | * | 4/1999 |
| JP | 11-124509 A | | 5/1999 |
| JP | 2000-129126 A | | 5/2000 |
| JP | 2003-55511 A | | 2/2003 |
| JP | 2003-206410 A | | 7/2003 |
| WO | WO 98/47939 A1 | | 10/1998 |
| WO | WO 03/011978 A1 | | 2/2003 |
| WO | WO 2004/022618 A1 | | 3/2004 |

\* cited by examiner

*Primary Examiner*—David Wu
*Assistant Examiner*—Robert Jones, Jr.
(74) *Attorney, Agent, or Firm*—Sughrue Mion, PLLC

(57) ABSTRACT

A problem of the present invention is to provide a curable composition which gives good curability, adhesiveness and storage stability by use of a catalyst other than organic tin catalysts. The above problem is solved by a curable composition, comprising: (A) one or more organic polymers having a reactive-silicon-containing group, and (B) a silanol condensation catalyst consisting of one or more compound(s) selected from organic tin compounds, carboxylic acids, and amine compounds, wherein at least one part of the reactive-silicon-containing group(s) of the organic polymer(s) (A) is represented by the following general formula (1): —$(CR^2_2)_2$—$(SiR^1_{2-a}X_aO)_m$—$SiX_3$ (1), and the silanol condensation catalyst (B) consists of amine compound(s) (B1) or consists of amine compound(s) (B1) and a carboxylic acid (B2), and when the mol number of the amine compound(s) is regarded as 1, the ratio by mol of the total amount of the carboxylic acid(s) to the amount of the amine compound(s) is 0.1 or less.

26 Claims, No Drawings

CURABLE COMPOSITION

FIELD OF THE INVENTION

The present invention relates to a curable composition comprising one or more polymers having a silicon-containing group which has a hydroxyl group or hydrolyzable group bonded to a silicon atom and can form a siloxane bond to be crosslinked (and silicon-containing group may be referred to as a "reactive-silicon-containing group" hereinafter).

It has been known that organic polymers each having, in the molecule thereof, at least one reactive silicon group have a nature that a siloxane bond is formed in company with hydrolysis reaction or the like of the reactive silicon group by moisture or the like even at room temperature, whereby the polymers are each crosslinked to give a rubber-like cured product.

Among these polymers having a reactive silicon group, polymers wherein the main chain skeleton thereof is a polyoxyalkylene polymer or polyisobutylene polymer are disclosed in JP-A-52-73998, JP-A-63-6041 and so on. The polymers are already produced industrially, and are widely used in articles as a sealant, an adhesive, a paint and so on.

The curable composition used in a sealant, an adhesive, a paint or the like, and a rubber-like curable product obtained by curing the composition are required to have various properties such as curability, adhesiveness, and mechanical property.

A polymer having, as the reactive silicon group, for example, a silicon group wherein two hydrolyzable groups are bonded per silicon atom gives a composition excellent in elongation or flexibility. As disclosed in WO 98/47939 and JP-A-2000-129126 and others, a polymer having a silicon group wherein three hydrolyzable groups are bonded per silicon atom gives a composition excellent in curability.

Recently, WO 2004/022618 and other publications have made it evident that a reactive-silicon-group-containing polymer having an especial terminal structure exhibits a very high curability.

A curable composition that contains an organic polymer having a reactive silicon group is subjected to curing treatment by use of a silanol condensation catalyst. Usually, there is widely used an organic tin-based catalyst having a carbon-tin bond, such as dibutyltin bis(acetylacetonate). However, in recent years, about organic tin-based compounds, the toxicity thereof has been pointed out. Thus, development in catalysts other than organic tin catalysts has been desired.

As catalysts other than organic tin catalysts, many researches have been made about carboxylic acid metal salts, metal alkoxides and the like. In particular, a carboxylic acid or an amine compound is a catalyst system containing no metal, and it is expected that an effect onto surroundings is relatively small. However, none of them have a sufficient curing performance as a silanol condensation catalyst for an organic polymer having a reactive silicon group. However, JP-A-5-117519 discloses that the curing performance is abruptly improved by using a carboxylic acid and an amine together.

DISCLOSURE OF THE INVENTION

Problems to be Solved by the Invention

However, a curable composition using a silanol condensation catalyst wherein a carboxylic acid and an amine compound are used together has a problem that a sufficient adhesiveness cannot be obtained with ease.

In the meantime, a reactive-silicon-group-containing polymer having an especial terminal structure, as disclosed in WO 2004/022618, is very reactive; thus, even if a silanol condensation catalyst which usually has a low activity is used, good curability can be obtained. Conversely, however, the curing speed is not easily adjusted since the reactivity is too high. Moreover, the condensation reaction of the polymer is advanced in the absence of any catalyst only by the presence of a small amount of moisture, so that the viscosity rises. It is therefore necessary to pay close attention to the storage thereof. Furthermore, the composition containing a catalyst may gelatinize when the composition is stored.

An object of the present invention is to provide a curable composition which is made mainly of a polymer having a reactive-silicon-containing group, and gives good curability, adhesiveness and storage stability by use of a catalyst other than organic tin catalysts.

Means for Solving the Problems

In order to solve such problems, the inventors have made eager investigations so as to complete the following inventions:

That is, the present intention relates to:

(1) A curable composition, comprising:
(A) one or more organic polymers having a reactive-silicon-containing group, and
(B) a silanol condensation catalyst consisting of one or more compound(s) selected from organic tin compounds, carboxylic acids, and amine compounds,
wherein at least one part of the reactive-silicon-containing group(s) of the organic polymer(s) (A) is represented by the following general formula (1):

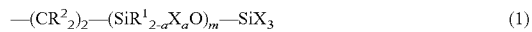

$$-(CR^2{}_2)_2-(SiR^1{}_{2-a}X_aO)_m-SiX_3 \qquad (1)$$

(wherein $R^1$s each independently represent a substituted or unsubstituted hydrocarbon group having 1 to 20 carbon atoms, or a triorganosiloxy group represented by $(R')_3SiO-$ wherein R's are each a substituted or unsubstituted hydrocarbon group having 1 to 20 carbon atoms, and R's, the number of which is 3, may be the same or different, $R^2$s are each independently a hydrogen atom, or a substituted or unsubstituted hydrocarbon group having 1 to 10 carbon atoms, Xs are each independently a hydroxyl group, or a hydrolyzable group, a is 0, 1 or 2, and m is 0 or an integer of 1 to 19), and
the silanol condensation catalyst (B) consists of amine compound(s) (B1).

The present intention also relates to:

(2) A curable composition, comprising:
(A) one or more organic polymers having a reactive-silicon-containing group, and
(B) a silanol condensation catalyst consisting of one or more compound(s) selected from organic tin compounds, carboxylic acids, and amine compounds,
wherein at least one part of the reactive-silicon-containing group(s) of the organic polymer(s) (A) is represented by the following general formula (1):

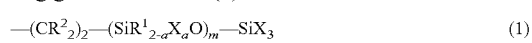

$$-(CR^2{}_2)_2-(SiR^1{}_{2-a}X_aO)_m-SiX_3 \qquad (1)$$

(wherein $R^1$s each independently represent a substituted or unsubstituted hydrocarbon group having 1 to 20 carbon atoms, or a triorganosiloxy group represented by $(R')_3SiO-$ wherein R's are each a substituted or unsubstituted hydrocarbon group having 1 to 20 carbon atoms, and R's, the number of which is 3, may be the same or different, $R^2$s are each independently a hydrogen atom, or a substituted or unsubstituted hydrocarbon group having 1 to 10 carbon atoms, Xs are each independently a hydroxyl group, or a hydrolyzable group, a is 0, 1 or 2, and m is 0 or an integer of 1 to 19), and the silanol condensation catalyst (B) consists of amine compound(s) (B1) and carboxylic acid(s) (B2), and when the mol number of the amine compound(s) is regarded as 1, the ratio by mol of the total amount of the carboxylic acid(s) to the amount of the amine compound(s) is 0.1 or less.

Furthermore, the present intention relates to:

(3) The curable composition according to any one of the above recitations, wherein X is an alkoxy group.

(4) The curable composition according to the above recitation, wherein the alkoxy group is a methoxy group.

(5) The curable composition according to any one of the above recitations, wherein the ratio of the organic polymer having the group represented by the general formula (1) in the organic polymer(s) of the component (A) is 10% or more by weight.

(6) The curable composition according to any one of the above recitations, wherein the main chain skeleton of the organic polymer(s) of the component (A) is at least one polymer selected from the group consisting of polyoxyalkylene polymers, saturated hydrocarbon polymers, and (meth) acrylic acid ester polymers.

(7) The curable composition according to the above recitation, wherein the polyoxyalkylene polymers are polyoxypropylene polymers.

(8) The curable composition according to any one of the above recitations, wherein the composition contains amine compound(s) (B1) as the silanol condensation catalyst (B) in an amount of 0.001 to 20 parts by weight for 100 parts by weight of the organic polymer(s) (A).

(9) The curable composition according to any one of the above recitations, wherein a silane coupling agent (C) is contained in an amount of 0.01 to 20 parts by weight for 100 parts by weight of the organic polymer(s) (A).

Additionally, according to the present invention, it is provided that:

(10) A one-part type curable composition, using the curable composition according to any one of the above recitations.

(11) A sealant, using the curable composition according to any one of the above recitations.

(12) An adhesive, using the curable composition according to any one of the above recitations.

EFFECTS OF THE INVENTION

The curable composition of the present invention has good curability, adhesiveness and storage stability although a catalyst other than organic tin catalysts is used.

BEST MODE FOR CARRYING OUT THE INVENTION

The present invention will be described in detail hereinafter.

The main chain skeleton of the organic polymer(s) used in the present invention, which has/have are active silicon group, is not particularly limited. Thus, polymer shaving various main chain skeletons can be used.

Specific examples thereof include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon polymers such as ethylene-propylene copolymer, polyisobutylene, copolymer made from isobutylene and isoprene or the like, polychloroprene, polyisoprene, copolymer made from isoprene or butadiene, acrylonitrile, and/or styrene or the like, polybutadiene, copolymer made from isoprene or butadiene, acrylonitrile, and styrene or the like, hydrogenated polyolefin polymers obtained by hydrogenating these polyolefin polymers, and other hydrocarbon polymers; polyester polymers each obtained by condensing a dibasic acid such as adipic acid and glycol, or by ring-opening-polymerizing a lactone; (meth) acrylic acid ester polymers each obtained by radical-polymerizing ethyl (meth)acrylate, butyl (meth)acrylate, or some other monomer; vinyl polymers each obtained by radical-polymerizing a (meth)acrylic acid ester monomer, vinyl acetate, acrylonitrile, styrene or some other monomer; graft polymers each obtained by polymerizing the vinyl monomer in any one of the above-mentioned organic polymers; polysulfide polymers; polyamide 6 obtained by ring-opening-polymerizing ε-caprolactam, polyamide 6,6 obtained by polycondensing hexamethylenediamine and adipic acid, polyamide 6,10 obtained by polycondensing hexamethylenediamine and sebacic acid, polyamide 11 obtained by polycondensing ε-aminoundecanoic acid, polyamide 12 obtained by ring-opening-polymerizing ε-aminolaurolactam, copolymer polyamides each having two or more components out of the above-mentioned polyamides, and other polyamide polymers; a polycarbonate polymer produced by polycondensing bisphenol A and carbonyl chloride; diallyl phthalate polymers; and other organic polymers. More preferred are saturated hydrocarbon polymers such as polyisobutylene, hydrogenated polyisoprene and hydrogenated polybutadiene, the polyoxyalkylene polymers, and the (meth)acrylic acid ester polymers since they have a relatively low glass transition temperature and give a cured product excellent in cold resistance.

The glass transition temperature of the polymer(s) of the component (A) is not particularly limited, and is preferably 20° C. or lower, more preferably 0° C. or lower, in particular preferably −20° C. or lower. If the glass transition temperature is higher than 20° C., the viscosity becomes high in winter or in cold districts so that the workability may deteriorate. Moreover, the flexibility of the cured product falls so that the elongation may lower. The glass transition temperature can be obtained by DSC measurement.

The polyoxyalkylene polymers and (meth)acrylic acid ester polymers are particularly preferred since they have high moisture permeability and can give a one-part type composition excellent in depth curability and adhesiveness. The polyoxyalkylene polymers are most preferred.

The reactive silicon group contained in the reactive-silicon-group-containing organic polymer(s) is a group which has a hydroxyl group or hydrolyzable group bonded to a silicon atom and which can form a siloxane bond by reaction accelerated by a silanol condensing catalyst so as to be crosslinked. The reactive silicon group may be a group represented by the following general formula (2):

  (2)

(wherein $R^1$ and $R^3$ each independently represent a substituted or unsubstituted hydrocarbon group having 1 to 20 carbon atoms, or a triorganosiloxy group represented by $(R')_3SiO$— (wherein R's are each independently a substituted or unsubstituted hydrocarbon group having 1 to 20 carbon atoms, R's, the number of which is three, may be the same or different), Xs each independently represent a hydroxyl or a hydrolyzable group, a is 0, 1 or 2, b is 0, 1, 2 or 3 provided that a case wherein a and b are 0 at the same time is not caused, and m is 0 or an integer of 1 to 19).

The hydrolyzable group is not particularly limited, and may be a hydrolyzable group known in the prior art. Specific examples thereof include a hydrogen atom, halogen atoms, and alkoxy, acyloxy, ketoximate, amino, amide, acidamide, aminooxy, mercapto, alkenyloxy groups and the like. Among them, a hydrogen atom, and alkoxy, acyloxy, ketoxymate, amino, amide, aminooxy, mercapto and alkenyloxy groups are preferred. The alkoxy groups are particularly preferred since the groups have mild hydrolyzability and good handleability.

One to three hydrolyzable groups or hydroxyl groups which are each the same as described above can be bonded onto the single silicon atom. The value of (a+Σb) is preferably from 1 to 5. When the hydrolyzable groups or hydroxyl groups the number of which is two or more are bonded into the reactive silicon group, they may be the same or different.

One or more silicon atoms are contained in the reactive silicon group in order to form the group. The number of the silicon atoms is preferably 20 or less in the case of silicon atoms linked to each other through one or more siloxane bonds or the like.

In particular, a reactive silicon group represented by the following general formula (3) is preferred since the group is easily available:

$$-SiR^3_{3-c}X_c \qquad (3)$$

(wherein $R^3$ and X have the same meanings as described above, and c is 1, 2, or 3).

Specific examples of $R^1$ and $R^2$ include alkyl groups such as a methyl, ethyl group and the like; cycloalkyl groups such as a cyclohexyl group and the like; aryl groups such as a phenyl group and the like; aralkyl groups such as a benzyl group and the like; and triorganosiloxy groups represented by $(R')_3SiO-$ wherein R's are each a methyl, phenyl group, or the like. Among them, a methyl group is particularly preferred.

More specific examples of the reactive silicon group include trimethoxysilyl, triethoxysilyl, triisopropoxysilyl, dimethoxymethylsilyl, diethoxymethylsilyl, and diisopropoxymethylsilyl groups. More preferred are the trimethoxysilyl, triethoxysilyl and dimethoxymethylsilyl group, and particularly preferred is the trimethoxysilyl group since they have a high activity to give a good curability. From the viewpoint of storage stability, the dimethoxymethylsilyl group is particularly preferred. The triethoxysilyl group is particularly preferred since an alcohol generated in company with the hydrolysis reaction of the reactive silicon group is ethanol so that a higher safety is exhibited.

It is essential that the curable composition of the present invention contains an organic polymer having, as the reactive-silicon-containing group in at least one portion thereof, a group represented by the following general formula (1):

$$(CR^2{}_2)_2-(SiR^1{}_{2-a}X_aO)_m-SiX_3 \qquad (1)$$

(wherein $R^1$, X, a and m have the same meanings as described above, and $R^2$s are each independently a hydrogen atom, or a substituted or unsubstituted hydrocarbon group having 1 to 10 carbon atoms).

In the case of using, as the component(s) (A), only an organic polymer having a reactive silicon group having two hydrolyzable groups on a silicon atom, such as a methyldimethoxysilyl group and the like, sufficient curability cannot be usually obtained when only the amine compound (B1) is caused to act thereon as a silanol condensation catalyst. On the other hand, when the curable composition contains, as an essential component, an organic polymer having a reactive silicon group having three hydrolyzable groups on a silicon atom, such as a trimethoxysilyl group and the like, a curable composition exhibiting good curability can be obtained by action of only the amine compound (B1). X in the general formula (1) is preferably a methoxy group since a higher curability is exhibited.

The organic polymer having a reactive silicon group having three hydrolyzable groups on a silicon atom tends to give a curable composition having good restorability, endurance, and creep resistance.

The organic polymer(s) (A) having a group represented by the general formula (1) is excellent in storage stability after the polymer(s) is/are stored for a long term since at least one carbon-carbon bond is interposed between the silicon atom of its/their reactive silicon group and the main chain and/or a side chain of the organic polymer(s). On the other hand, a polymer having, at its terminal, a group wherein no carbon-carbon bond is interposed between the silicon atom of a reactive silicon group and the main chain and/or a side chain, such as a $-NHCH_2Si(OEt)_3$ group, exhibits a very high curability. However, the reactivity of such a polymer is too high. Conversely, thus, the curing speed is not easily adjusted. Moreover, the condensation reaction of the polymer is advanced in the absence of any catalyst only by the presence of a small amount of water, so that the viscosity increases. It is therefore necessary to pay close attention to the storage of the polymer. Furthermore, the composition containing a catalyst may gelatinize when the composition is stored. From the viewpoint of storage stability and work ability, the content by percentage of the polymer wherein no carbon-carbon bond is interposed between the silicon atom of a reactive silicon group and the main chain and/or a side chain is preferably less than 10% by weight of the total of the polymer(s) (A). It is particularly preferred that the polymer is not contained at all.

The ratio of the organic polymer(s) having a group represented by the general formula (1) in all of the organic polymer(s) (A) used in the present invention is arbitrary, and is preferably 10% or more by weight, more preferably 20% or more by weight in order to yield a curable composition wherein speedy curability and storage stability are satisfied.

The reactive silicon group may be introduced by a known method. Specifically, the following methods can be exemplified:

(A) An organic polymer having in the molecule thereof a functional group such as a hydroxyl group is caused to react with an organic compound having an active group reactive with this functional group and an unsaturated group to yield an organic polymer having the unsaturated group. Alternatively, the polymer is copolymerized with an unsaturated-group-containing epoxy compound, thereby yielding an unsaturated-group-containing polymer. Next, the resultant reaction product is caused to act on a hydrosilane having a reactive silicon group, thereby hydrosililating the product.

(B) An unsaturated-group-containing organic polymer obtained in the same manner as in the method (A) is caused to react with a compound having a mercapto group and a reactive silicon group.

(C) An organic polymer having in the molecule thereof a functional group such as a hydroxyl group, epoxy group or isocyanate group is caused to react with a compound having a functional group reactive with this functional group and a reactive silicon group.

Out of the above-mentioned methods, the method (A) and the method of causing a polymer having a hydroxyl group at its terminal to react with a compound having an isocyanate group and a reactive silicon group among variations of the method (C) are preferred since a high conversion ratio can be obtained in a relatively short reaction time. The method (A) is particularly preferred since the reactive-silicon-group-containing organic polymer obtained by the method (A) becomes a curable composition having a lower viscosity and a better workability than the organic polymer obtained by the method (C) and the organic polymer obtained by the method (B) generates a strong odor based on mercaptosilane.

Specific examples of the hydrosilane used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoximatesilane such as bis(dimethylketoximate)methylsilane, bis(cyclohexylketoximate)methylsilane and the like. However, the hydrosilane is not limited thereto. Among them, halogenated silanes, and alkoxysialnes are preferred, and alkoxysialnes are most preferred since they give a curable composition having a mild hydrolyzability and good handleability. Out of the alkoxysilanes, methyldimethoxysilane is particularly preferred since it is easily available and a curable composition containing the organic polymer obtained therefrom has high curability, storage stability, elongation property and tensile strength.

Out of the above-mentioned hydrosilanes, a hydrosilane represented by the following general formula (4) is preferred since a curable composition made of the organic polymer obtained by addition reaction of the hydrosilane compound has very good curability:

(wherein X has the same meaning as described above). Out of hydrosilane compounds represented by the general formula (4), more preferred are trialkoxysilanes such as trimethoxysilane, triethoxysilane, triisopropoxysilane and the like.

Out of the trialkoxysialnes, a trialkoxysilane having an alkoxy group having one carbon atom (a methoxy group), such as trimethoxysilane and the like, may cause speedy advance of disproportionation reaction. When the disproportionation reaction advances, compounds having a very high reactivity, such as dimethoxysialne, are generated. From the viewpoint of safe handling, it is preferred to use a trialkoxysialne having an alkoxy group having 2 or more carbon atoms and represented by the following general formula (5):

(wherein $R^4$s, the number of which is three, are each independently an organic group having 2 to 20 carbon atoms). Triethoxysilane is most preferred from the viewpoint of availability and safe handling.

The synthesis method (B) may be, for example, a method of introducing a compound having a mercapto group and a reactive silicon group into an unsaturated bond moiety of the organic polymer by radical addition reaction in the presence of a radical initiator and/or a radical-generating source. However, the method (B) is not particularly limited. Specific examples of the compound having a mercapto group and a reactive silicon group include γ-mercaptopropyltrimethoxysilane, γ-mercaptopropylmethyldimethoxysilane, γ-mercaptopropyltriethoxysilane, γ-mercaptopropylmethyldiethoxysilane and the like. However, the compound is not limited thereto.

Out of variations of the synthesis method (C), the method of causing a polymer having a hydroxyl group at its terminal to react with a compound having an isocyanate group and a reactive silicon group may be, for example, a method disclosed in JP-A-3-47825. However, the method is not particularly limited. Specific examples of the compound having an isocyanate group and a reactive silicon group include γ-isocyanate propyltrimethoxysilane, γ-isocyanate propylmethyldimethoxysilane, γ-isocyanate propyltriethoxysilane, γ-isocyanate propylmethyldiethoxysilane and the like. However, the compound is not limited thereto.

As described above, a silane compound wherein three hydrolyzable groups are bonded to a single silicon atom, such as trimethoxysilane, may cause advance of disproportionation reaction. When the disproportionation reaction advances, a considerably dangerous compound such as dimethoxysilane is generated. However, such disproportionation reaction does not advance about γ-mercaptopropyltrimethoxysilane or γ-isocyanate propyltrimethoxysilane. Therefore, in the case of using a group wherein three hydrolyzable groups are bonded to a single silicon atom, such as a trimethoxy group, as the silicon-containing group, it is preferred to use the synthesis method (B) or (C).

The organic polymer(s) having a reactive silicon group may be linear or branched, and the number-average molecular weight thereof, in terms of styrene according to GPC, is from about 500 to 100,000, more preferably from 1,000 to 50,000, in particular preferably from 3,000 to 30,000. If the number-average molecular weight is less than 500, inconveniences tend to be caused about the elongation property of the cured product. If the molecular weight is more than 100,000, the cured product comes to have a high viscosity so that inconveniences tend to be caused about workability.

In order to obtain a rubber-like cured product exhibiting a high strength, a high elongation and a low elasticity, the number of reactive silicon groups contained in the organic polymer or each of the polymers is, on average, at least one, preferably from 1.1 to 5 per molecule of the polymer. If the number of the reactive silicon groups contained per molecule is less than one on average, the curability becomes insufficient so that a good rubber-like elasticity behavior is not easily expressed. The reactive silicon groups may be present on a terminal of the main chain of the molecule chain of the organic polymer(s) or a terminal of a side chain thereof, or may be present on both of the terminals. In particular, when the reactive silicon groups are present only on a terminal of the main chain of the molecular chain, a rubber-like cured product exhibiting a high strength, a high elongation and a low elasticity is easily obtained since the effective network length of the organic polymer component(s) contained in the cured product, which is finally formed, becomes long.

The above-mentioned polyoxyalkylene polymers are each a polymer which essentially has a recurring unit represented by the following general formula (6):

(wherein $R^5$ is a linear or branched alkylene group having 1 to 14 carbon atoms). $R^5$ in the general formula (6) is preferably a linear or branched alkylene group having 1 to 14 carbon atoms, preferably 2 to 4 carbon atoms. Specific examples of the recurring unit represented by the general formula (6) include:

[Formula 1]

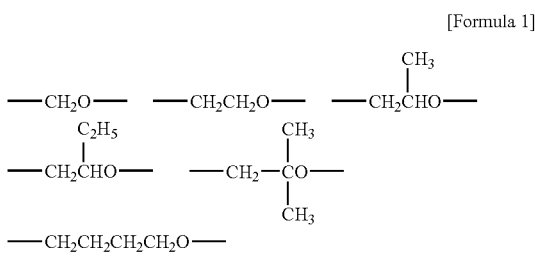

The main chain skeleton of the polyoxyalkylene polymer may be made of only one kind of recurring unit, or may be made of two or more kinds of recurring units. In the case that the composition is used, in particular, for a sealant, a material made of a polymer made mainly of a propylene oxide polymer is preferred since the material is amorphous and has a relatively low viscosity.

Examples of the method for synthesizing the polyoxyalkylene polymer include a polymerization method based on an alkali catalyst such as KOH, a polymerization method based on a transition metal compound/porphyrin complex catalyst obtained by reaction between an organic aluminum compound and porphyrin, as described in JP-A-61-215623, a polymerization method based on a composite metal cyanide complex catalyst, as described in JP-B-46-27250, JP-B-59-15336, and U.S. Pat. Nos. 3,278,457, 3,278,458, 3,278,459, 3,427,256, 3,427,334, 3,427,335, and other publications; a polymerization method using a catalyst made of a polyphosphazene salt, as exemplified in JP-A-10-273512; and a polymerization method using a catalyst made of a phosphazene compound, as exemplified in JP-A-11-060722. However, the method is not limited thereto.

Examples of the method for producing the polyoxyalkylene polymer having a reactive silicon group include methods suggested in JP-B-45-36319 and 46-12154, JP-A-50-156599, 54-6096, 55-13767, 55-13468 and 57-164123, JP-B-3-2450, and U.S. Pat. Nos. 3,632,557, 4,345,053, 4,366,307, 4,960,844, and other publications; and polyoxyalkylene polymers having a number-average molecular weight of 6,000 or more and a Mw/Mn of 1.6 or less, which has a high molecular weight and a narrow molecular weight distribution, as suggested in JP-A-61-197631, 61-215622, 61-215623, 61-218632, 3-72527, 3-47825, and 8-231707. However, the method is not particularly limited thereto.

The above-mentioned polyoxyalkylene polymers having a reactive silicon group may be used alone or in combination of two or more thereof.

The saturated hydrocarbon polymers are each a polymer which does not substantially contain any carbon-carbon unsaturated bond other than those in an aromatic ring. The polymer which constitutes the skeleton thereof can be obtained by a method (1) of polymerizing, as a main monomer, an olefin compound having 2 to 6 carbon atoms, such as ethylene, propylene, 1-butene or isobutylene, a method (2) of homo-polymerizing a diene compound such as butadiene or isoprene, or copolymerizing the diene compound and one or more out of the above-mentioned olefin compounds, and then hydrogenating the homopolymer or copolymer, or some other methods. Isobutylene polymers or hydrogenated polybutadiene polymers are preferred since one or more functional groups can easily be introduced into a terminal thereof, the molecular weight thereof is easily controlled and further the number of the terminal functional groups can be made large. The isobutylene polymers are particularly preferred.

The polymer having a main chain skeleton made of a saturated hydrocarbon polymer has a very good characteristic in heat resistance, weather resistance, endurance, and humidity blocking property.

The isobutylene polymers may each be a polymer wherein all of their monomer units are isobutylene units, or a copolymer made from isobutylene units and a different monomer. From the viewpoint of rubber-like characteristics, the recurring units originating from isobutylene are contained preferably in an amount of 50% or more by weight, more preferably in an amount of 80% or more by weight, in particular preferably in an amount of 90 to 99%.

As the method for synthesizing the saturated hydrocarbon polymer, hitherto various polymerization methods have been reported. In recent years, in particular, a large number of, what is called, living polymerizations have been developed. In the case of a saturated hydrocarbon polymer, in particular, an isobutylene polymer, the following are known: the polymer can easily be produced by using iniferter polymerization found out by Kennedy et al. (J. P. Kennedy et al., J. Polymer Sci., Polymer Chem. Ed. 1997, vol. 15, 2843); the polymer can be produced by polymerization, so as to have a molecular weight of about 500 to 100,000 and a molecular weight distribution of 1.5 or less; and various functional groups can be introduced into a terminal of the molecule.

The method for synthesizing the saturated hydrocarbon polymer having a reactive silicon group is described in, for example, JP-B-4-69659 and 7-108928, JP-A-63-254149, 64-22904 and 1-197509, Japanese Patent Official Gazette Nos. 2539445 and 2873395, JP-A-7-53882, and other publications. However, the method is not particularly limited thereto.

The above-mentioned saturated hydrocarbon polymers having a reactive silicon group may be used a lone or in combination of two or more thereof.

The (meth)acrylic acid ester monomer which constitutes the main chain of the above-mentioned (meth)acrylic acid ester polymers is not particularly limited, and various monomers can be used. Examples thereof include (meth)acrylic acid based monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, γ-(methacryloyloxypropyl)trimethoxysilane, γ-(methacryloyloxypropyl)dimethoxymethylsilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethylmethyl) (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate and the like. In the (meth)acrylic acid ester polymers, any (meth)acrylic acid ester monomer may be copolymerized with a vinyl monomer, which will be described hereinafter. Examples of the vinyl monomer include styrene monomers such as styrene, vinyltoluene, α-methylstyrene, chlorostyrene, styrenesulfonic acid and salts thereof, and the like; fluorine-containing vinyl monomers such as perfluoroethylene, perfluoropropylene, fluorinated vinylidene and the like; silicon-containing vinyl monomers such as vinyltrimethoxysilane, vinyltriethoxysilane and the like; maleic anhydride, maleic acid, and monoalkyl esters and dialkyl esters of maleic acid; fumaric acid, monoalkyl ester and dialkyl ester of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile-group-containing vinyl monomers such as acrylonitrile, methacrylonitrile and the like; amide-group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; and vinyl chloride, vinylidene chloride, allyl chloride, allyl alcohol and the like. These may be used alone, or plural ones thereof may be copolymerized. Among them, a polymer made from a styrene monomer and a (meth)acrylic acid based monomer is preferred from the viewpoint of physical properties of the product, and others. More preferred is a (meth)acrylic polymer made from an acrylic acid ester monomer and a methacrylic acid ester monomer. Particularly preferred is an acrylic polymer made from an acrylic acid ester monomer. In articles for ordinary buildings, a butyl acrylate based monomer is further preferred since the composition is required to have a low viscosity and the cured product is required to have a low modulus, a high elongation, weather resistance, heat resistance and other physical properties. On the other hand, in articles required to have oil resistance and others, for cars, a copolymer made mainly of ethyl acrylate is further preferred. This polymer made mainly of ethyl acrylate is excellent in oil resistance, but tends to be somewhat poor in low-temperature property (cold resistance); therefore, in order to improve the low-temperature property, ethyl acrylate is partially substituted with butyl acrylate. However, a good oil resistance is gradually damaged with an increase in the ratio of butyl acrylate. In articles required to have oil resistance, the ratio is preferably 40% or less, more preferably 30% or less. It is also preferred to use 2-methoxyethyl acrylate or 2-ethoxyethyl acrylate, wherein oxygen is introduced into an alkyl group of a side chain, in order to improve the low-temperature property and others without damaging the oil resistance. However, when the alkoxy group, which has an ether bond, is introduced to the side chain, a poor heat resistance tends to be exhibited; thus, when heat resistance is required, the ratio thereof is preferably 40% or less. The ratio is varied, considering oil resistance, heat resistance, low-temperature property and other physical properties necessary in accordance with usages or a requested purpose. In this way, an appropriate polymer can be obtained. An unrestricted example excellent in physical balances between oil resistance, heat resistance, low-temperature property and others is a copolymer of ethyl acrylate/butyl acrylate/2-methoxyethyl acrylate (ratio by weight: 40 to 50/20 to 30/30 to 20). In the present invention, a monomer out of these preferred monomers may be copolymerized with a different monomer, or may be block-copolymerized there with. At this time, the preferred monomer is contained preferably at a ratio by weight of 40% or more. In the above-mentioned expressions, for example, (meth)acrylic acid represents acrylic acid and/or methacrylic acid.

The method for synthesizing such a (meth)acrylic acid ester polymer is not particularly limited, and may be a known method. However, the polymer obtained by an ordinary free-radical polymerization method using an azo compound, a peroxide or the like as a polymerization initiator has a problem that the value of the molecular weight distribution is generally as large as 2 or more, and the viscosity becomes high. Accordingly, it is preferred to use a living radical polymerization method in order to yield a (meth)acrylic acid ester polymer having a narrow molecular weight distribution and a low viscosity and containing, at a terminal of the molecule chain thereof, a crosslinkable functional group at a high content by percentage.

Out of variations of the "living radical polymerization method", the "atom transfer radical polymerization method" of polymerizing the (meth)acrylic acid ester monomer, using an organic halide, halogenated sulfonyl compounds or the like as an initiator and a transition metal complex as a catalyst, is more preferred as a method for producing a (meth)acrylic acid ester polymer having a specific functional group since the terminal has a halogen or the like, which is relatively advantageous for functional-group-converting reaction, and the flexibility in design of the initiator or the catalyst is large as well as the characteristics of the above-mentioned "living polymerization method" are exhibited. This atom transfer radical polymerization method is described in, for example, Matyjaszewski et al., J. Am. Chem. Soc., 1995, vol. 117, 5614.

As the method for producing the (meth)acrylic acid ester polymer having a reactive silicon group, a production process using a free radical polymerization method using a chain transfer agent is disclosed in, for example, JP-B-3-14068 and 4-55444, and JP-A-6-211922. JP-A-9-272714 and others disclose a production process using an atom transfer radical polymerization method. However, the method is not particularly limited thereto.

The above-mentioned (meth)acrylic acid ester polymers having a reactive silicon group may be used a lone or in combination of two or more thereof.

These organic polymers having a reactive silicon group may used alone or in combination of two or more thereof. Specifically, it is allowable to use an organic polymer obtained by blending two or more selected from the group consisting of the polyoxyalkylene polymers having a reactive silicon group, the saturated hydrocarbon polymers having a reactive silicon group, and the (meth)acrylic acid ester polymers having a reactive silicon group.

The method for producing an organic polymer wherein a polyoxyalkylene polymer having a reactive silicon group is blended with a (meth)acrylic acid ester polymer having a reactive silicon group is suggested in JP-A-59-122541, 63-112642, 6-172631 and 11-116763, and other publications. However, the method is not particularly limited thereto. A preferred specific example thereof is a method of blending a polyoxyalkylene polymer having a reactive silicon group with a copolymer which has a reactive silicon group and has a molecular chain composed substantially of (meth)acrylic acid ester monomer units each having 1 to 8 carbon atoms and represented by the following general formula (7):

$$-CH_2-C(R^6)(COOR^7)- \quad (7)$$

(wherein $R^6$ represents a hydrogen atom or a methyl group, and $R^7$ represents an alkyl group having 1 to 8 carbon atoms), and (meth)acrylic acid ester monomer units each having an alkyl group having 10 or more carbon atoms and represented by the following general formula (8):

$$—CH_2—C(R^6)(COOR^8)— \quad (8)$$

(wherein $R^6$ has the same meaning as described above, and $R^8$ represents an alkyl group having 10 or more carbon atoms).

Examples of $R^7$ in the general formula (7) include alkyl groups having 1 to 8 carbon atoms, preferably 1 to 4 carbon atoms, more preferably 1 to 2 carbon atoms, such as a methyl, ethyl, propyl, n-butyl, t-butyl, and 2-ethylhexyl group. The alkyl groups as $R^7$ may be used alone or in the form of a mixture of two or more thereof.

Examples of $R^8$ in the general formula (8) include long-chain alkyl groups having 10 or more carbon atoms, usually 10 to 30 carbon atoms, preferably 10 to 20 carbon atoms, such as lauryl, tridecyl, cetyl, stearyl, and behenyl groups. The alkyl groups as $R^8$ may be used alone or in the form of a mixture of two or more thereof in the same manner as $R^7$.

The molecular chain of the (meth)acrylic acid ester copolymer is composed substantially of the monomer units of the formula (7) and (8). The word "substantially" referred to herein means that the total amount of the monomer units of the formula (6) and (8) present in the copolymer is over 50% by weight. The total amount of the monomer units of the formula (7) and (8) is preferably 70% or more by weight.

The presence ratio by weight of the monomer units of the formula (7) to the monomer units of the formula (8) is preferably from 95/5 to 40/60, more preferably from 90/10 to 60/40.

Examples of a monomer unit which is different from the monomer units of the formula (7) and (8) and may be contained in the copolymer include acrylic acids such as acrylic acid, methacrylic acid and the like; monomers containing an amide group, such as N-methylolacrylamide, N-methylolmethacrylamide and the like, those containing an epoxy group, such as glycidyl acrylate, glycidyl methacrylate and the like, and those containing a nitrogen-containing group, such as diethylaminoethyl acrylate, diethylaminoethyl methacrylate and the like; and other monomer units originating from acrylonitrile, styrene, α-methylstyrene, alkyl vinyl ether, vinyl chloride, vinyl acetate, vinyl propionate, ethylene, or the like.

An organic polymer wherein a saturated hydrocarbon polymer having a reactive silicon group is blended with a (meth)acrylic acid ester copolymer having a reactive silicon group is suggested in JP-A-1-168764 and 2000-186176, and other publications. However, the polymer is not limited thereto.

A different example of the method for producing an organic polymer containing, as a blend component, a (meth) acrylic acid ester copolymer having a reactive silicon functional group is a method of polymerizing a (meth)acrylic acid ester monomer in the presence of an organic polymer having a reactive silicon group. This production method is specifically disclosed in JP-A-59-78223, 59-168014, 60-228516 and 60-228517, and other publications. However, the method is not limited thereto.

On the other hand, the main chain skeleton of the organic polymer(s) may contain a different component such as a urethane bond component as long as the advantageous effects of the present invention are not largely damaged.

The urethane bond component is not particularly limited, and an example thereof is a group generated by reaction between an isocyanate group and an active hydrogen group (and the group may be referred to as an amide segment hereinafter).

The amide segment is represented by the following general formula (9):

$$—NR^9—C(=O)— \quad (9)$$

(wherein $R^9$ represents a hydrogen atom or a substituted or unsubstituted organic group).

Specific examples of the amide segment include a urethane group generated by reaction between an isocyanate group and a hydroxyl group; a urea group generated by reaction between an isocyanate group and an amino group; and a thiourethane group generated by reaction between an isocyanate group and a mercapto group, and the group. In the present invention, groups generated by causing the active hydrogen occurring in the urethane group, the urea group and the thiourethane group to react further with an isocyanate group are also contained in the category of the group of the formula (9).

An example of the method for producing a polymer having an amide segment and a reactive silicon group with industrial ease is a method of causing a polymer having an active-hydrogen-containing group as its terminal to react with an excessive amount of a polyisocyanate compound to prepare a polymer having an isocyanate group at its polyurethane main chain terminal, and subsequently or simultaneously causing a part or the whole of individuals of the isocyanate group to react with a Z group of a silicon compound represented by the following general formula (10):

$$Z—R^{10}—SiR^3{}_{3-c}X_c \quad (10)$$

(wherein $R^3$, X and c have the same meanings as described above, and $R^{10}$ is a bivalent organic group, more preferably a substituted or unsubstituted bivalent hydrocarbon group having 1 to 20 carbon atoms; and Z is an active-hydrogen-containing group selected from hydroxyl, carboxyl, mercapto, and mono-substituted or unsubstituted amino groups), thereby producing the polymer. Examples of known organic polymer-producing methods related to this production method include methods disclosed in JP-B-46-12154 (U.S. Pat. No. 3,632,557), JP-A-58-109529 (U.S. Pat. No. 4,374, 237), JP-A-62-13430 (U.S. Pat. No. 4,645,816), JP-A-8-53528 (EP 0676403), JP-A-10-204144 (EP 0831108), JP-A-2003-508561 as Japanese Patent Application National Publication (U.S. Pat. No. 6,197,912), JP-A-6-211879 (U.S. Pat. No. 5,364,955), JP-A-10-53637 (U.S. Pat. No. 5,756, 751), JP-A-11-100427, 2000-169544, 2000-169545 and 2002-212415, Japanese Patent No. 3313360, U.S. Pat. Nos. 4,067,844 and 3,711,445, and JP-A-2001-323040, and other publications.

Another example of the above-mentioned method is a method of causing a polymer having an active-hydrogen-containing group at its terminal to react with a reactive-silicon-group-containing isocyanate compound represented by the following general formula (11):

$$O=C=N—R^{10}—SiR^3{}_{3-c}X_c \quad (11)$$

(wherein $R^3$, $R^{10}$, X and c have the same meanings as described above), thereby producing the polymer. Examples of known polymer-producing methods related to this production method include methods disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, 2002-155145 and 2002-249538, WO 03/018658, WO 03/059981 and other publications.

Examples of the organic polymer having an active-hydrogen-containing group at its terminal include oxyalkylene polymer having a hydroxyl group at its terminal (polyetherpolyol), polyacrylpolyol, polyesterpolyol, saturated hydrocarbon polymer having a hydroxyl group at its terminal (polyolefinpolyol), polythiol compounds, polyamine compounds, polyalkyleneimine and the like. Among them, polyetherpolyol, polyacrylpolyol and polyolefinpolyol are preferred since the resultant polymer has a relatively high glass transition temperature and the resultant cured product has very good cold resistance. The polyetherpolyol is particularly preferred since the resultant polymer has a low viscosity to exhibit a good workability and the depth curability thereof is good. The polyacrylpolyol and the saturated hydrocarbon polymers are more preferred since the cured product of the resultant polymer has good weather resistance and heat resistance.

As the polyetherpolyol, polyetherpolyol that is produced by any method can be used. Preferred is polyetherpolyol having, at its terminal, a hydroxyl group the number of individuals of which is at least 0.7 per molecular terminal on the average of all the molecules. Specific examples thereof include oxyalkylene polymer produced by use of a conventional alkali metal catalyst; and oxyalkylene polymer produced by causing an initiator such as a polyhydroxy compound, which has at least two hydroxyl groups, to react with an alkylene oxide in the presence of a composite metal cyanide complex or cesium.

Out of the above-mentioned polymerization methods, the polymerization method using a composite metal cyanide complex is preferred since the method makes it possible to yield oxyalkylene polymer having a lower unsaturated degree, a narrow Mw/Mn, a lower viscosity, a high acid resistance and a high weather resistance.

The polyacrylpolyol may be a polyol having a skeleton of an alkyl (meth)acrylate (co)polymer and having in the molecule thereof a hydroxyl group. The method for synthesizing the polymer is preferably a living polymerization method since a polymer having a narrow molecular weight distribution and a low viscosity can be obtained. An atom transfer radical polymerization method is more preferred. It is also preferred to use a polymer based on the so-called SGO process, which is obtained by subjecting an alkyl acrylate ester monomer described in JP-A-2001-207157 to continuous bulk polymerization at high temperature and high pressure. A specific example thereof is a "UH-2000" manufactured by Toagosei Co., Ltd or the like.

Specific examples of the above-mentioned polyisocyanate compound include aromatic polyisocyanates such as toluene (tolylene)diisocyanate, diphenylmethane diisocyanate, xylylene diisocyanate and the like; and aliphatic polyisocyanates such as isophoronediisocyanate, and hexamethylenediisocyanate and the like.

The silicon compound of the general formula (10) is not particularly limited, and specific examples thereof include amino-group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane and the like; hydroxygroup-containing silanes such as γ-hydroxypropyltrimethoxysilane and the like; and mercapto-group-containing silanes such as γ-mercaptopropyltrimethoxysilane and the like, and the like. As described in JP-A-6-211879 (U.S. Pat. No. 5,364,955), JP-A-10-53637 (U.S. Pat. No. 5,756,751), JP-A-10-204144 (EP 0831108), and JP-A-2000-169544 and 2000-169545, the following can also be used as the silicon compound of the general formula (10): Michael addition reactants made from a variety of α,β-unsaturated carbonyl compounds and an amino-group-containing silane; and Michael addition reactants made from a variety of (meth)acryloyl-group-containing silanes and an amino-group-containing compound.

The reactive-silicon-group-containing isocyanate compound of the general formula (11) is not particularly limited, and specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate and the like. As described in JP-A-2000-119365 (U.S. Pat. No. 6,046,270), a compound obtained by causing a silicon compound of the general formula (10) to react with an excessive amount of the above-mentioned polyisocyanate compound can also be used as the reactive-silicon-group-containing isocyanate compound of the general formula (11).

When the amount of the amide segment in the main chain skeleton of the organic polymer(s) which is/are the component (A) in the present invention is large, the viscosity of the organic polymer tends to be high. After the storage of the polymer(s), the viscosity may also rise so that the workability of the resultant composition may lower. Accordingly, in order to obtain a composition having very good storage stability and workability, it is preferred that the amide segment is not substantially contained therein. On the other hand, the amide segment in the main chain skeleton of the component (A) tends to cause an improvement in the curability of the composition of the present invention. Accordingly, when the main chain skeleton of the component(s) (A) contains an amide segment, the number of individuals of the amide segment is preferably from 1 to 10, more preferably from 1.5 to 5, in particular preferably from 2 to 3 per molecule on the average. If the number is less than 1, the curability may be sufficient. If the number is more than 10, the organic polymer becomes highly viscous so that a composition poor in workability may be obtained.

In the present invention, as the silanol condensing catalyst of the component (B), an amine compound is used. It has been well-known that a carboxylic acid metal salt or an alkoxy metal can be used as a substitute for an organic tin catalyst from the viewpoint of a decrease in a load onto the environment. The amine compound (B1) used in the present invention is a catalyst in substitution for an organic tin catalyst, and is a metal-free compound. Thus, the compound (B1) can be expected to produce a smaller effect onto the environment. The amine compound (B1) referred to herein does not include, in the category thereof, any amine compound having a reactive silicon group, that is, the so-called aminosilane. The amine compound (B1) works as a silanol condensation catalyst, and does not include, in the category thereof, any hindered amine, which is used as a light stabilizer, either.

It has been known that an amine compound can be used as a silanol condensation catalyst; however, as described in JP-A-5-117519 also, in the case of using an organic polymer having a dimethoxysilyl group as a reactive silicon group, practical curing performance is not exhibited. However, in the case of using an organic polymer having a reactive-silicon-containing group represented by the general formula (1) as in the present invention, the amine compound (B1) acts as a silanol condensation catalyst having a sufficiently practical curing performance.

The amine compound (B1) used as the silanol condensing catalyst of the component (B) in the present invention includes, in the category thereof, nitrogen-containing cyclic compounds such as pyridine and the like. Specific examples thereof include aliphatic primary amines such as methylamine, ethylamine, propylamine, isopropylmine, butylamine, amylamine, hexylamine, octylamine, 2-ethylhexylamine, nonylamine, decylamine, laurylamine, pentadecylamine, cetylamine, stearylamine, cyclohexylamine and the like; aliphatic secondary amides such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, butylstearylamine and the like; aliphatic tertiary amines such as triamylamine, trihexylamine, trioctylamine and the like; aliphatic unsaturated amines such as triallylamine, oleylamine and the like; aromatic amines such as aniline, lauryaniline, stearylaniline, triphenylamine and the like; and heterocyclic amines such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,8-diazabicyclo(5,4,0)undecene-7 (DBU), 1,5-diazabicyclo(4,3,0)nonene-5 (DBN), 1,4-diazabicyclo(2,2,2)octane (DABCO), aziridine and the like; and other amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-butylaminopropylamine, 3-morpholinopropylamine, 2-(1-piperazinyl)ethylamine, xylylenediamine, guanidine, diphenylguanidine, aryl-substituted biguanides such as 1-o-tolylbiguanide, 1-phenylbiguanide and the like, 2,4,6-tris(dimethylaminomethyl)phenol and the like. The amine compound is not limited thereto.

Among them, 2-(dimethylamino)pyridine, 4-(dimethylamino)pyridine, 2-hydroxypyridine, imidazole, DBU, DBN, DABCO, and other heterocyclic compounds are preferred since they exhibit a high activity. DBU and DBN are more preferred. Aryl-substituted biguanides are also preferred since they exhibit a high adhesiveness.

Amine compounds exhibit basicity; an amine compound wherein the pKa value of the conjugate acid thereof is 11 or more is preferred since the catalyst activity is high. In particular, DBU or DBN is particularly preferred since the compound is a base wherein the pKa value of the conjugate acid is 12 or more so as to exhibit a high catalyst activity.

On the other hand, an amine compound represented by the following general formula (12) tends to exhibit a high curability:

(wherein Y is one selected from O, N, S and P; when Y is O or S, d is 1 and when Y is N or P, d is 2; $R^{11}$s are each a hydrogen atom, or a substituted or unsubstituted hydrocarbon group having 1 to 20 carbon atoms; when the number of $R^{11}$s is two, $R^{11}$s may be the same or different; $R^{12}$ is a substituted or unsubstituted bivalent hydrocarbon group having 1 to 10 carbon atoms; and $R^{13}$ is a hydrogen atom or a methyl group). In particular, monoethanolamine, 3-hydroxypropylamine, ethylenediamine, N-methylethylenediamine, 1,3-propanediamine, N-methyl-1,3-propanediamine, N,N'-dimethyl-1,3-propanediamine, and diethylenetriamine can be preferably used.

In the case of using an amine compound having an aromatic ring structure such as a phenyl group or the like, the curable composition may be colored or the cured product may be colored with time. Thus, attention should be paid to the use thereof. From this viewpoint, it is preferred to use an amine compound having no aromatic ring.

A ketimine which generates the above-mentioned amine compound by hydrolysis can also be used as the amine compound (B1), which is used as the silanol condensation catalyst in the present invention.

About the amine compound (B), only one species thereof may be used or two or more species thereof may be used together.

The use amount of the amine compound (B1) is preferably from about 0.001 to 20 parts by weight, more preferably from about 0.1 to 10 parts by weight for 100 parts by weight of the component (A). If the blend amount of the amine compound (B1) is below this range, the curing speed may become slow and the catalyst activity may fall after the composition is stored. On the other hand, if the blend amount of the amine compound (B1) is over this range, the time when the composition can be used becomes too short so that the workability may deteriorate.

In the present invention, as a silanol condensing catalyst, a carboxylic acid (B2) together with an amine compound (B1) can be used. When a carboxylic acid is used together with an amine compound, curability of the obtained curable composition can be improved. However, adhesiveness thereof tends to lower with increasing the additive amount of a carboxylic acid. Thus, an amount of carboxylic acid (B2) to be used in the present invention is preferably 0.1 or less by molar ratio for 1.0 of an amine compound. When excellent adhesiveness thereof is particularly required, it is preferable a carboxylic acid is not contained.

Specific examples of carboxylic acid (B2) which is used together with an amine compound (B1) include straight chain saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, montanic acid, melissic acid, lacceric acid and the like; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, 10-undecenoic acid and the like; polyene unsaturated fatty acids such as linoelaidic acid, linoleic acid, 10,12-octadecadienoic acid, hiragoic acid, alpha-eleostearic acid, beta-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nishinic acid, docosahexaenoic acid and the like; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid and the like; fatty acids having a triple bond such as propiolic acid, tariric acid, stearolic acid, crepenynic acid, ximenynic acid, 7-hexadecynoic acid and the like; alicyclic carboxylic acids such as naphthenic acid, malvalic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicycle[2.2.1]heptane-1-carboxylic acid, bicycle[2.2.2]octane-1-carboxylic acid and the like; oxygen containing fatty acids such as acetoacetic acid, ethoxy acetic acid, glyoxylic acid, glycolic acid, gluconic acid, sabinic acid, 2-hydroxytetradecanoic acid, ipurolic acid, 2,2-dimethyl-3-hydroxypropionic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, camlolenic acid, licanic acid, pheronic acid, cerebronic acid, 2-methyl-7-oxabicyclo[2.2.1]-5-heptene-2-carboxylic acid and the like; and halogen substituted monocarboxylic acids such as chloroacetic acid, 2-chloroacrylic acid and chlorobenzoic acid. Examples of aliphatic dicarboxylic acids include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, 1,2,2-trimethyl-1,3-cyclopentanedicarboxylic acid; and unsatureated dicarboxylic acids such as maleic acid, fumaric acid, acetylenedicarboxylic acid and itaconic acid. Examples of aliphatic polycarboxylic acids include tricarboxylic acids such as aconitic acid, 4,4-dimethylaconitic acid, citric acid, isocitric acid, 3-methylisocitric acid and the like. Examples of aromatic carboxylic acids include aromatic monocarboxylic acids such as benzoic acid, 9-anthracenecarboxylic acid, atrolactic acid, anisic acid, isopropylbenzoic acid, salicylic acid and toluic acid; and aromatic polycarboxylic acids such as phthalic acid, isophthalic acid, terephthalic acid, carboxyphenylacetic acid, pyromellitic acid and the like.

Of these, monocarboxylic acids are more preferred and linear monocarboxylic acids are even more preferred since they have good compatibility with the component (A).

When the melting point of a carboxylic acid is high (the crystallinity is higher), the handling thereof becomes difficult (the workability becomes bad). Accordingly, the melting point of the carboxylic acid (B2) used together with the amine compound as the silanol condensation catalyst is preferably 65° C. or lower, more preferably from −50 to 50° C., in particular preferably from −40 to 35° C.

Furthermore, the number of carbon atoms in the carboxylic acid (B2) is preferably from 5 to 20, more preferably from 6 to 18, in particular preferably from 8 to 12. If the number of the carbon atoms is larger than this range, the carboxylic acid turns easily in a solid form, whereby the acid is not easily made compatible with the component (A). Thus, the activity thereof tends not to be obtained. On the other hand, if the number of the carbon atoms is smaller, the volatility of the carboxylic acid becomes high so that odor tends to increase.

As described above, from the viewpoint of availability and workability, preferred are 2-ethylhexanoic acid, octanoic acid, oleic acid, naphthenic acid, 2,2-dimethyloctanoic acid, 2-ethyl-2,5-dimethylhexanoic acid, neodecanoic acid, versatic acid and the like.

About the carboxylic acid (B2) used together with the amine compound (B1), only one species thereof may be used, or two or more species thereof may be used together.

A silane coupling agent (C) can be used as an adhesiveness supplier in the curable composition of the present invention. The silane coupling agent referred to herein is a compound having, in the molecule thereof, a hydrolyzable silicon group and a functional group other than the silicon group. The agent exhibits a remarkable adhesiveness improving effect under a non-primer condition or primer-treatment condition when the agent is applied to a variety of substrates, that is, inorganic base materials such as glass, aluminum, stainless steel, zinc, copper, mortar and the like, and organic base materials such as vinyl chloride, acrylic resin, polyester, polyethylene, polypropylene, polycarbonate and the like. When the agent is used under a non-primer condition, the effect of improving the adhesiveness onto the various substrates is particularly remarkable. Besides, the silane coupling agent is a compound which can function as a physical property adjustor, an agent for improving the dispersibility of an inorganic filler, or some other agents.

An example of the hydrolyzable silicon group of the silane coupling agent is a group wherein Z is a hydrolyzable group out of the groups represented by the general formula (1). Specific examples thereof include the groups already exemplified as a hydrolyzable group. Methoxy and ethoxy groups are preferred from the viewpoint of the hydrolysis rate thereof. The silane coupling agent preferably has two or more hydrolyzable groups, and in particular preferably has three or more hydrolyzable groups.

Examples of the functional group other than the hydrolyzable silicon group include substituted or unsubstituted amino, mercapto, carboxyl, vinyl, and isocyanate groups, isocyanurate, halogens and others. Among them, substituted or unsubstituted amino and isocyanate groups, and isocyanurate are preferred since they have a high adhesiveness improving effect. The amino groups are particularly preferred.

In the case of using a catalyst wherein a carboxylic acid and an amine compound are used together, the addition of a silane coupling agent, in particular, an aminosilane thereto usually tends to cause a fall in the curing performance. On the other hand, in the case of using only the amine compound (B1) as the silanol condensation catalyst (B) in the present invention, the decreasing degree of the curing performance based on the addition of an aminosilane is small. In some cases, an effect of improving the curing performance is obtained.

Specific examples of the silane coupling agent include isocyanate silanes such as γ-isocyanate propyltrimethoxysilane, γ-isocyanate propyltriethoxysilane, γ-isocyanate propylmethyldiethoxysilane, γ-isocyanate propylmethyldimethoxysilane, (isocyanatemethyl) trimethoxysilane, (isocyanatemethyl) dimethoxymethylsilane and the like; ketimine type silanes such as N-(1,3-dimethylbutylidene)-3-(triethoxysilyl)-1-propaneamie and the like; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane and the like; carboxysialnes such as β-carboxyethyltriethoxysilane, β-carboxyethylphenylbis(2-methoxyethoxy)silane, N-β-(carboxymethyl)aminoethyl-γ-aminopropyltrimethoxysilane and the like; vinyl-type-unsaturated-group-containing silanes such as vinyltrimethoxysilane, vinyltriethoxysilane, γ-methacryloyloxypropylmethyldimethoxysilane, γ-acryloyloxypropyltriethoxysilane and the like; halogen-containing silanes such as γ-chloropropyltrimethoxysilane and the like; and isocyanurate silanes such as tris(3-trimethoxysilylpropyl) isocyanurate and the like, and the like. A reactant of an aminosilane and an isocyanate silane as described above, a reactant of an aminosilane and a (meth)acryloyloxy-group-containing silane, or the like can also be used. Condensation products obtained by condensing the above-mentioned silanes partially can also be used. Furthermore, derivatives obtained by modifying these can also be used as the silane coupling agent, examples of the derivatives including amino-modified silyl polymers, sililated aminopolymers, unsaturated aminosilane complexes, phenylamino long-chain alkylsilanes, aminosililated silicones, and sililated polyesters.

The silane coupling agents may be used alone or in the form of a mixture of two or more thereof.

The use amount of the component (C) used in the present invention is preferably from about 0.01 to 20 parts by weight, more preferably from about 0.1 to 10 parts by weight, even more preferably from about 1 to 7 parts by weight for 100 parts by weight of the component (A). If the blend amount of the component (C) is below this range, a sufficient adhesiveness may not be obtained. As described above, in the present invention, the curability may be improved by the addition of an aminosilane. However, if the blend amount of the component (C) is over this range, a practical curing speed tends not to be obtained. Moreover, the curing reaction may not sufficiently advance with ease.

As the adhesiveness supplier, which is not particularly limited, the following can be used besides the component (C) in the present invention: for example, an epoxy resin, a phenol resin, sulfur, an alkyl titanate, an aromatic polyisocyanate and others. The adhesiveness suppliers may be used alone or in the form of a mixture of two or more thereof.

In the present invention, a different curing catalyst may be used together to such a degree that the advantageous effects of the present invention are not lowered. Specific examples include derivatives of the carboxylic acids (carboxylic anhydrides, esters, amides, nitriles and acyl chlorides); carboxylic acid metal salts such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, cerium carboxylate and other carboxylates; titanium compounds such as tetrabutyl titanate, tetrapropyl titanate, titanium tetrakis(acetylacetonate), bis(acetylacetonate)diisopropoxytitanium, diisopropoxytitanium bis(ethylacetonate) and other titanates; organic tin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltindiacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetate), a reactant of dibutyltin oxide and a silicate compound, and a reactant of dibutyltin oxide and a phthalic acid ester and other tin compounds; aluminum compounds such as aluminum tris(acetylacetonate), aluminum tris(ethylacetoacetate), and diisopropoxyaluminum methylacetoacetate and other aluminum compounsd; zirconium compounds such as zirconium tetrakis(acetylacetonate) and the like; various metal alkoxides such as tetrabutoxyhafnium and the like; organic acidic phosphates; organic sulfonic acids such as trifluoromethanesulfonic acid and the like; and inorganic acids such as hydrochloric acid, phosphoric acid, boronic acid and other acids. When any one of these curing catalysts is used together, the catalyst activity becomes high and an improvement is expected in depth curability, thin-layer curability, adhesiveness, and others. However, if the amount of the added carboxylic acid is large, a sufficient adhesiveness may not be obtained. Moreover, in accordance with the amount of the added organic tin compound, the restorability, the endurance and the creep resistance of the cured product of the resultant curable composition decline.

From the viewpoint of a decrease in a load onto the environment, the curable composition of the present invention is preferably a composition other than organic tin curable compositions, which does not contain the above-mentioned organic tin-based compound, more preferably a tin-free curable composition which does not contain any tin compound such as the above-mentioned tin compound, tin carbonate and the like, even more preferably a composition other than organic tin and metal carbonate curable compositions, which neither contains the above-mentioned organic tin compound nor the above-mentioned metal carbonate. The curable composition is in particular preferably a metal-catalyst-free curable composition which contains none of the above-mentioned metal-element-containing curing catalysts such as the above-mentioned metal carbonate, titanium compound, organic tin compound, aluminum compound zirconium compound and the like.

A filler can be added to the composition of the present invention. Examples of the filler include reinforcing fillers such as fume silica, precipitating silica, crystalline silica, fusedsilica, dolomite, silicic anhydride, hydrated silicic acid, and carbon black and the like; ground calcium carbonate, colloidal calcium carbonate, magnesium carbonate, diatomaceous earth, calcined clay, clay, talc, titanium oxide, bentonite, organic bentonite, ferric oxide, aluminum fine powder, flint powder, zinc oxide, active zinc white, shirasu balloon, glass micro-balloon, organic micro-balloon made of phenol resin or vinylidene chloride resin, PVC powder, PMMA powder, and other resin powders; and fibrous fillers such as asbestos, glass fiber, and filament and the like. When the filler is used, the use amount thereof is from 1 to 250 parts by weight, preferably from 10 to 200 parts by weight for 100 of the polymer(s) of the component(s) (A).

As described in JP-A-2001-181532, the filler can be dehydrated and dried in advance by mixing the filler with a dehydrating agent such as calcium oxide and the like into a homogeneous form, putting the mixture air-tightly into a bag made of an airtight material, and then allowing the bag to stand still for an appropriate time. By use of this filler, which has a low water content, the storage stability of the composition can be improved, in particular, when the composition is rendered a one-part type composition.

When a composition having a high transparency is obtained, there can be used, as a filler, polymer powder made of a polymer such as methyl methacrylate and the like, amorphous silica, or the like, as described in JP-A-11-302527. Moreover, a composition having a high transparency can be obtained by using, as a filler, hydrophobic silica, which silicon dioxide fine powder is having a surface to which hydrophobic groups are bonded, as described in JP-A-2000-38560. The surface of the silicon dioxide fine powder generally has silanol groups (—SiOH), and the silanol groups are caused to react with an organic silicon halide, an alcohol or the like, thereby producing (—SiO-hydrophobic group). The resultant product is hydrophobic silica. Specifically, dimethylsiloxane, hexamethyldisilazane, dimethyldichlorosilane, trimethoxyoctylsilane, trimethylsilane or the like is caused to react with and is bonded to the silanol groups present in the surface of the silicon dioxide fine powder. The resultant is hydrophobic silica. Silicon dioxide fine powder having a surface made of silanol groups (—SiOH) is called hydrophilic silica fine powder.

When a cured product having a high strength is desired to be obtained by the use of the filler, the filler is preferably a filler selected from fume silica, precipitating silica, crystalline silica, fused silica, dolomite, silicic anhydride, hydrated silicic acid, carbon black, surface-treated fine calcium carbonate, calcined clay, clay, active zinc white, and others. When the filler is used in an amount of 1 to 200 parts by weight for 100 parts by weight of the organic polymer(s) (A) having a reactive silicon group, a preferred result can be obtained. Further, in the case that a cured product having a low strength and a large elongation at break is desired to be obtained, a preferred result can be obtained when a filler selected from titanium oxide, a calcium carbonate species such as ground calcium carbonate, magnesium carbonate, talc, ferric oxide, zinc oxide, shirasu balloon, and others is used in an amount of 5 to 200 parts by weight for 100 parts by weight of the polymer(s) (A) having a reactive silicon group. As the value of the specific surface area of calcium carbonate is larger, the effect of improving the rupture strength, the elongation at break and the adhesiveness of the cured product becomes larger. Of course, these fillers may be used alone or in the form of a mixture of two or more thereof. When calcium carbonate is used, it is desired to use surface-treated fine calcium carbonate, and a calcium carbonate species having a large particle diameter, such as ground calcium carbonate and the like, together. The particle diameter of the surface-treated fine calcium carbonate is preferably 0.5 μm or less, and the surface treatment is preferably treatment with a fatty acid or a fatty acid salt. Moreover, the particle diameter of the calcium carbonate species having a large particle diameter is preferably 1 μm or more, and the species not subjected to any surface treatment can be used.

In order to improve the workability (such as anti-dripping) of the composition or make the surface of the cured product mat, it is preferred to add an organic balloon or inorganic balloon thereto. The filler may be subjected to surface treatment. Only one species thereof may be used, or two or more species thereof may be used in a mixture form. To improve the work ability (such as anti-dripping), the particle diameter of the balloons is preferably 0.1 mm or less. To make the cured product surface mat, the diameter is preferably from 5 to 300 μm.

The composition of the present invention can be preferably used for: a joint of outer walls of a building, such as siding boards, in particular, ceramic siding boards and others; an adhesive agent for outer wall tiles; an adhesive agent, for outer wall tiles, that may remain as it is in the joint of the walls; or the like since the cured product therefrom has good chemical resistance and other properties. It is desired that the design of outer walls is in harmony with the design of the sealant. The composition is used for high-quality outer walls when sputtering paint is used together or colored aggregate is incorporated into the composition. When a scaly or granular substance having a diameter of about 0.1 mm or more, preferably about 0.1 to 5.0 mm is blended with the composition of the present invention, the cured product is in harmony with high-quality outer walls and the external appearance of the cured product is maintained over a long term since the cured product is excellent in chemical resistance. When the granular substance is used, the surface becomes a sandy surface with a scattered sand tone or a sandstone tone. When the scaly substance is used, the surface becomes an uneven surface based on the scales.

As described in JP-A-9-53063, a diameter, a blend amount, a material and other factors preferred for the granular substance are as follows:

The diameter is about 0.1 mm or more, preferably from about 0.1 to 5.0 mm. In accordance with the material or pattern of outer walls, and others, the substance which has an appropriate size can be used. The substance which has a size of about 0.2 to 5.0 mm, or about from 0.5 to 5.0 mm can also be used. In the case of the scaly substance, the thickness is made as small (about 0.01 to 1.00 mm) as about ⅒ to ⅕ of the diameter. The scaly or granular substance is beforehand incorporated into the sealing main material, and the resultant is carried as a sealant to a construction site, or when the substance is used, the substance is incorporated into the sealing main material in a construction site.

The scaly or granular substance is blended in an amount of about 1 to 200 parts by weight for 100 parts by weight of the composition such as the composition for a sealing or an adhesive. The blend amount is appropriately selected in accordance with the size of individual pieces or grains of the scaly or granular substance, the material or the pattern of outer walls, and others.

As the scaly or granular substance, there is used a natural material such as silica sand, mica and the like, synthetic rubber, synthetic resin, and an inorganic material such as alumina and the like. In order to make the designability thereof high when it is filled into a joint portion, the substance is colored into an appropriate color in accordance with the material or the pattern of outer walls, and others.

A preferred finishing method and so on are described in JP-A-9-53063.

When a balloon (preferably having an particle diameter of 0.1 mm or more) is used for a similar purpose, the cured product has a sandy surface with a scattered sand tone or a sandstone tone and further the cured product can be made light. As described in JP-A-10-251618, a diameter, a blend amount, a material and other factors preferred for the balloon are as follows:

The balloon is a spherical filler the inside of which is hollow. Examples of the material of this balloon include inorganic materials such as glass, shirasu, silica and the like, and organic materials such as phenol resin, urea resin, polystyrene, saran and the like. However, the material is not limited only thereto. An inorganic material and an organic material can be compounded, or the materials are laminated to form a multilayer. A balloon made of an inorganic material, an organic material, or a material wherein these are compounded can be used. Further, a single balloon or a mixture wherein different balloons are mixed may be used. Furthermore, the balloon that can be used may be a balloon having a worked or coated surface or a balloon having a surface treated with a variety of surface treating agents. For example, an organic balloon may be coated with calcium carbonate, talc, titanium oxide, or the like, or an inorganic balloon may be surface-treated with a silane coupling agent.

In order to obtain a sandy surface with a scattered sand tone or a sandstone tone, the granular diameter of the balloon is preferably 0.1 mm or more. A balloon having a granular diameter of about 0.2 to 5.0 mm or about 0.5 to 5.0 mm can also be used. If the diameter is less than 0.1 mm, only the viscosity of the composition is raised but a sandy feeling may not be exhibited even if a large amount of the balloon is blended with the other components. The blend amount of the balloon can easily be decided in accordance with the degree of a desired sandy feeling with a scattered sand tone or sandstone tone. Usually, it is desired to blend a balloon having a granular diameter of 0.1 mm or more at a volume concentration of 5 to 25% by volume of the composition. If the volume concentration of the balloon is less than 5% by volume, no sandy feeling is obtained. If the concentration is more than 25% by volume, the viscosity of the sealant or adhesive becomes high so that the workability deteriorates. Moreover, the modulus of the cured product also becomes high. Thus, basic performances of the sealant or adhesive tend to be damaged. For the balance between the feeling and basic performances of the sealant, a particularly preferred volume concentration is from 8 to 22% by volume.

When the balloon is used, the following can be added: a slip inhibitor as described in JP-A-2000-154368, or an amine compound for changing the surface of the cured product into an uneven state to make the surface mat, in particular, a primary amine and/or a secondary amine having a melting point of 35° C. or higher, as described in JP-A-2001-164237.

Specific examples of the balloon are described in JP-A-2-129262, 4-8788, 4-173867, 5-1225, 7-113073, 9-53063, 10-251618, 2000-154368 and 2001-164237, WO 97/05201, and other publications.

A thermally expandable fine hollow body can be used, which is described in JP-A-2004-51701 and 2004-66749, and other publications. The thermally expandable fine hollow body is a plastic sphere body wherein a low boiling point compound, such as a hydrocarbon having 1 to 5 carbon atoms, is wrapped into a sphere form with a polymeric outer shell material (such as vinylidene chloride copolymer, acrylonitrile copolymer, or vinylidene chloride-acrylonitrile copolymer). When an adhesion portion wherein the present composition is used is heated, the pressure of gas in the shell of the thermally expandable fine hollow body increases so that the polymeric outer shell material becomes soft. In this way, the volume expands abruptly so that the hollow body fulfils a function of peeling off the adhesion interface. The addition of the thermally expandable fine hollow body makes it possible to yield an adhesive composition which can be peeled off without breaking any material only by heating when unnecessary and can further be peeled off by heating without using any organic solvent.

When the composition of the present invention contains sealant cured particles, it is possible as well to make irregularities in the surface and improve the designability. As described in JP-A-2001-115142, a diameter, a blend amount, a material and others preferred for the sealant cured particles are as follows: The diameter is preferably from about 0.1 to 1 mm, more preferably from about 0.2 to 0.5 mm. The blend amount in the curable composition is preferably from 5 to 100% by weight, more preferably from 20 to 50% by weight of the composition. Examples of the material include urethane resin, silicone, modified silicone, polysulfide rubber and the like. The material is not limited as long as the material is a material used for sealants. A modified silicone based sealant is preferred.

A tackifier may be added to the composition of the present invention. The tackifier of resin (tackifying resin) is not particularly limited, and may be a resin that is usually used whether the resin is in a solid form or in a liquid form at normal temperature. Specific examples thereof include styrene based block copolymer, a hydrogenated product thereof, phenol resin, modified phenol resins (such as cashew oil modified phenol resin, tall oil modified phenol resin and the like), terpene-phenol resin, xylene-phenol resin, cyclopentadiene-phenol resin, coumalin-indene resin, rosin resin, rosin ester resin, hydrogenated rosin ester resin, xylene resin, low molecular weight polystyrene resin, styrene copolymer resin, petroleum resins (such as C5 hydrocarbon resin, C9 hydrocarbon resin, C5C9 hydrocarbon copolymer resin and the like), hydrogenated petroleum resins, terpene resin, and DCPD resin petroleum resin and the like. These may be used alone or in combination of two or more thereof. Examples of the styrene block copolymer and the hydrogenated product thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene copolymer (SIBS) and the like. These tackifying resins may be used alone or in combination of two or more thereof.

The tackifying resin is used in an amount of 5 to 1,000 parts by weight, preferably from 10 to 100 parts by weight for 100 parts by weight of the organic polymer(s) (A).

A solvent or a diluting agent can be added to the composition of the present invention. The solvent and the diluting agent are not particularly limited, and the following can be used: aliphatic hydrocarbons, aromatic hydrocarbons, alicyclic hydrocarbons, halogenated hydrocarbons, alcohols, esters, ketones, ethers and others. When the solvent or the diluting agent is used, the boiling point of the solvent is preferably 150° C. or higher, more preferably 200° C. or higher, in particular preferably 250° C. or higher in light of a problem of air pollution when the composition is used indoors. The above-mentioned solvents or diluting agents may be used alone or in combination of two or more thereof.

Moreover, a silicate can be used in the composition of the present invention. This silicate acts as a crosslinking agent, and has a function of improving the restorability, the endurance and the creep resistance of the polymer(s) of the component (A) in the present invention. Furthermore, the silicate also has a function of improving the adhesiveness, the water-resistant adhesiveness, and the adhesion endurance under high temperature and high humidity. As the silicate, tetraalkoxysilane or a partially-hydrolyzed condensation product thereof can be used. In the case of using the silicate, the use amount thereof is preferably from 0.1 to 20 parts by weight, more preferably from 0.5 to 10 parts by weight for 100 parts by weight of the polymer(s) of the component (A).

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, tetra-t-butoxysilane and the like; and partially-hydrolyzed condensation products thereof.

The partially-hydrolyzed condensation products of tetraalkoxysilanes are more preferred since their effects of improving the restorability, the endurance and the creep resistance in the present invention are larger than those of tetraalkoxysilanes.

Examples of the partially-hydrolyzed condensation products of tetraalkoxysilanes include products each obtained by adding water to a tetraalkoxysilane in a usual way, and then hydrolyzing the resultant partially so as to be condensed. Furthermore, as partially-hydrolyzed condensation products of organosilicate compounds, commercially available products can be used. Examples of the condensation products include Methyl Silicate 51 and Ethyl Silicate 40 (each manufactured by Colcoat Co., Ltd.), and the like.

A plasticizer can be added to the composition of the present invention. The addition of the plasticizer makes it possible to adjust the viscosity and the slump property of the curable composition, and the tensile strength, the elongation and other mechanical properties of the cured product obtained by curing the composition. Examples of the plasticizer include phthalic acid esters such as dibutyl phthalate, diheptyl phthalate, bis(2-ethylhexyl) phthalate, butylbenzyl phthalate and the like; non-aromatic bibasic acid esters such as dioctyl adipate, dioctyl sebacate, dibutyl sebacate, isodecyl succinate and the like; aliphatic esters such as butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially-hydrogenated terphenyl and the like; process oils; epoxy plasticizers such as epoxidized soybean oil, benzyl epoxystearate and the like.

A polymeric plasticizer can be used. In the case of using the polymeric plasticizer, the initial physical properties are maintained over a longer term than in the case of using a low molecular weight plasticizer, which does not contain in the molecule thereof any polymeric component. Furthermore, when an alkyd paint is painted onto the cured product, the drying property, which may be called paintability, can be improved. Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, pentaerythritol esters and the like; polyester plasticizers each made from a dibasic acid such as sebacic acid, adipic acid, azelaic acid, phthalic acid or the like, and a dihydric alcohol such as ethylene glycol, diethylene glycol, triethylene glycol, propylene glycol, dipropylene glycol or the like; polyethers, for example, polyetherpolyols such as polyethylene glycol, polypropylene glycol polytetraethylene glycol or the like, which has a molecular weight of 500 or more, preferably 1000 or more, and derivatives obtained by changing hydroxyl groups of these polyetherpolyols to ester groups, ether groups, or the like, and the like; polystyrenes such as polystyrene, and poly-α-methylstyrene, and the like; and polybutadiene, polybutene, polyisobutylene, butadiene-acrylonitrile, and polychloroprene and the like. However, the polymeric plasticizer is not limited thereto.

Out of these polymeric plasticizers, ones compatible with the component (A) are preferred. From this viewpoint, polyethers and vinyl polymers are preferred. When a polyether is used as the plasticizer, the surface curability and the depth curability are improved. Moreover, after the composition is stored, the composition does not undergo curing delay. Thus, the use is preferred. Out of the plasticizers, polypropylene glycol is more preferred. From the viewpoint of compatibility, weather resistance and heat resistance, vinyl polymers are preferred. Out of the vinyl polymers, acrylic polymers and/or methacrylic polymers are preferred, and acrylic polymers such as poly(alkyl acrylate)s are more preferred. The method for synthesizing the polymers is preferably a living radical polymerization method since the molecular weight distribution is narrow and the viscosity is low. An atomic transfer radical polymerization method is more preferred. It is also preferred to use a polymer based on the so-called SGO process, which is obtained by subjecting an alkyl acrylate monomer described in JP-A-2001-207157 to continuous bulk polymerization at high temperature and high pressure.

The number-average molecular weight of the polymeric plasticizer is preferably from 500 to 15,000, more preferably from 800 to 10,000, even more preferably from 1000 to 8,000, in particular preferably from 1,000 to 5,000. The molecular weight is most preferably from 1,000 to 3,000. If the molecular weight is too low, the plasticizer flows out with time by heat or rainfall so that the initial physical properties cannot be maintained over a long term, the plasticizer causes pollution based on adhesion of dust thereto, and the alkyd paintability cannot be improved. If the molecular weight is too high, the viscosity becomes high so that the workability deteriorates. The molecular weight distribution of the polymeric plasticizer is not particularly limited, and a narrow distribution is preferred. The distribution is preferably less than 1.80, more preferably 1.70 or less, even more preferably 1.60 or less, even more preferably 1.50 or less, in particular preferably 1.40 or less, most preferably 1.30 or less.

In the case that the plasticizer is a polyether polymer, the number-average molecular weight is measured by terminal group analysis. In the case that the plasticizer is any other polymer, the number-average molecular weight is measured by a GPC method. The molecular weight distribution (Mw/Mn) is measured by the GPC method (in terms of polystyrene).

The polymeric plasticizer may have no reactive silicon group, or may have a reactive silicon group. When the plasticizer has a reactive silicon group, the plasticizer acts as a reactive plasticizer. Thus, the plasticizer can be prevented from being shifted from the cured product. When the plasticizer has a reactive silicon group, the number of individuals of the reactive silicon group is preferably 1 or less, more preferably 0.8 or less per molecule on average. In the case of using a plasticizer having a reactive silicon group, in particular, an oxyalkylene polymer having a reactive silicon group, the number-average molecular weight thereof is preferably lower than that of the polymer(s) of the component (A). If not so, plasticizing effect may not be obtained.

About the plasticizer, only one species thereof may be used, or two or more species thereof may be used together. A low molecular weight plasticizer and a polymeric plasticizer may be used together. These plasticizers may be blended when the polymer(s) is/are produced.

The amount of the used plasticizer is from 5 to 150 parts by weight, preferably from 10 to 120 parts by weight, even more preferably from 20 to 100 parts by weight for 100 parts by weight of the polymer(s) of the component (A). If the amount is less than 5 parts by weight, effects as a plasticizer are not expressed. If the amount is more than 150 parts by weight, the mechanical strength of the cured product is insufficient.

If necessary, a physical property adjustor for adjusting tensile characteristics of the cured product may be added to the curable composition of the present invention. The physical property adjustor is not particularly limited, and examples thereof include alkylalkoxysilanes such as methyltrimethoxysilane, dimethyldimethoxysilane, trimethylmethoxysilane, n-propyltrimethoxysilane and the like; alkoxysilanes having an unsaturated group, such as dimethyldiisopropenoxysilane, methyltriisopropenoxysilane, other alkylisopropenoxysilanes, vinyltrimethoxysilane, vinyldimethylmethoxysilane and the like; silicone vanish; polysiloxanes and the like. The use of the physical property adjustor makes it possible that when the composition of the present invention is cured, the hardness is raised or the hardness is conversely lowered so as to improve the property of elongation at break. The above-mentioned physical property adjustors may be used alone or in combination of two or more thereof.

In particular, a compound which can be hydrolyzed, thereby generating a compound having in the molecule thereof a monovalent silanol group has an effect of lowering the modulus of the cured product without deteriorating the stickiness of the surface of the cured product. A compound which can generate trimethylsilanol is particularly preferred. Examples of the compound which can be hydrolyzed, thereby generating a compound having in the molecule thereof a monovalent silanol group include compounds described in JP-A-5-17521. Other examples thereof include compounds which are each a derivative of an alkylalcohol such as hexanol, octanol, decanol and the like, and can each generate a silicon compound which can be hydrolyzed, thereby generating $R_3SiOH$ such as trimethylsilanol and the like; and compounds which are each a derivative of a polyhydric alcohol having 3 or more hydroxyl groups, such as trimethylolpropane, glycerin, pentaerythritol, sorbitol and the like, as described in JP-A-11-241029, and can each generate a silicon compound which can be hydrolyzed, thereby generating R₃SiOH such as trimethylsilanol and the like.

Different examples thereof include compounds which are each a derivative of an oxypropylene polymer, and can each generate a silicon compound which can be hydrolyzed, thereby generating R₃SiOH such as trimethylsilanol and the like, as described in JP-A-7-258534. Furthermore, there can be used a polymer having a crosslinkable, hydrolyzable silicon-containing group and a silicon-containing group which can be hydrolyzed so as to be converted to a monosilanol-containing compound, as described in JP-A-6-279693.

The physical property adjustor is used in an amount of 0.1 to 20 parts by weight, preferably 0.5 to 10 parts by weight for 100 parts by weight of the organic polymer(s) (A) having a reactive silicon group.

If necessary, a thixotrope (anti-dripping agent) may be added to the curable composition of the present invention to prevent the composition from dripping and to make the workability better. The anti-dripping agent is not particularly limited, and examples thereof include polyamide waxes; hydrogenated castor oil derivatives; and metal soaps such as calcium stearate, aluminum stearate, barium stearate and the like. In the case of using rubber powder having a particle diameter of 10 to 500 μm as described in JP-A-11-349916 or an organic fiber as described in JP-A-2003-155389, a composition having a high thixotropy and a good workability can be obtained. These thixotropes (anti-dripping agents) may be used alone or in combination of two or more thereof. The thixotrope(s) is/are used in an amount of 0.1 to 20 parts by weight for 100 parts by weight of organic the polymer(s) (A) having a reactive silicon group.

In the composition of the present invention, a compound having in a single molecule thereof an epoxy group can be used. When the compound having an epoxy group is used, the restorability of the cured product can be made high. Examples of the compound having an epoxy group include epoxidized unsaturated oils and fats, epoxidized unsaturated aliphatic acid esters, alicyclic epoxy compounds, epichlorohydrin derivatives and mixtures thereof, and the like. Specific examples thereof include epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among them, E-PS is particularly preferred. It is advisable to use the epoxy compound in an amount of 0.5 to 50 parts by weight for 100 parts by weight of the organic polymer(s) (A) having a reactive silicon group.

In the composition of the present invention, a photo-curable material can be used. When the photo-curable material is used, a coating of the photo-curable material is formed on the surface of the cured product. Thus, the stickiness or the weather resistance of the cured product can be improved. The photo-curable material is a material which undergoes a chemical change in molecular structure by action of light so as to generate a physical change such as curing. As a compound of this type, many materials are known, examples of which include organic monomers, oligomers, resins and compositions containing these materials and the like. Any commercially available products can be used. Typically, an unsaturated acrylic compound, a polyvinyl cinnamate, an azide resin or the like can be used. The unsaturated acrylic compound is a monomer or oligomer having one or more acrylic or methacrylic unsaturated groups, or a mixture thereof. Examples thereof include propylene (or butylene or ethylene) glycol di(meth)acrylate, neopentyl glycol di(meth)acrylate and the like, or oligoesters made from such a monomer and having a molecular weight of 10000 or less. Specific examples thereof include ARONIX M-210, ARONIX M-215, ARONIX M-220, ARONIX M-233, ARONIX M-240, and ARONIX M-245, which are each an especial (bifunctional) acrylate; (trifunctional) ARONIX M-305, ARONIX M-309, ARONIX M-310, ARONIX M-315, ARONIX M-320, and ARONIX M-325; and (polyfunctional) ARONIX M-400 and the like. In particular, compounds having an acrylic functional group are preferred, and compounds each containing in a single molecule thereof 3 or more acrylic functional groups on average are preferred. (The above-mentioned ARONIX are products manufactured by Toagosei Co., Ltd.)

The polyvinyl cinnamate is a photosensitive resin having a cinnamoyl group as a photosensitive group, and examples thereof include a product obtained by esterifying polyvinyl alcohol with cinnamic acid, and many polyvinyl cinnamate derivatives. The azide resin has been known as a photosensitive resin having an azide group as a photosensitive group. An example thereof is a rubber photosensitive liquid wherein a diazide compound is usually added as a photosensitive agent. Detailed examples thereof are described in "Photosensitive Resin" (published on Mar. 17, 1972 by Insatsu Gakkai Shuppanbu Ltd., on and after p. 93, on and after p. 106, and on and after p. 117). These may be used alone or in a mixture form in a state that a sensitizer is added there to if necessary. When a sensitizer such as a ketone, a nitro compound and the like, or an accelerator such as an amine and the like is added thereto, advantageous effects may be improved. It is advisable to use the photo-curable material in an amount of 0.1 to 20 parts by weight, preferably 0.5 to 10 parts by weight for 100 parts by weight of the organic polymer(s) (A) having a reactive silicon group. If the amount is less than 0.1 part by weight, no effect of improving the weather resistance is produced. If the amount is 20 parts or more by weight, the cured product becomes too hard so that the product tends to be cracked.

An oxygen curable material can be used in the composition of the present invention. Examples of the oxygen curable material include unsaturated compounds reactive with oxygen in air. The material reacts with oxygen in air to form a cured coating in the vicinity of the surface of the cured product, thereby fulfilling an act of preventing the stickiness of the surface or adhesion of wastes or dust onto the cured product surface. Specific examples of the oxygen curable material include drying oils, typical examples of which are tung oil and linseed oil; various alkyd resins obtained by modifying the compounds; acrylic polymer, epoxy resin, and silicone resin which are each modified with a drying oil; liquid polymers such as 1,2-polybutadiene, 1,4-polybutadiene, C5 to C8 diene polymer and the like, which are each obtained by polymerizing or copolymerizing one or more diene compounds such as butadiene, chloroprene, isorepene, and/or 1,3-pentadiene; liquid copolymers such as NBR, SBR and the like, which are each obtained by copolymerizing a monomer copolymerizable with the diene compounds, such as acrylonitrile, styrene and the like, with one or more of the diene compounds so as to make the diene compound(s) into one or more main components; and various modified products thereof (such as maleic acid modified products boiled oil modified products and the like). These may be used or in combination of two or more thereof. Among them, tung oil and liquid diene polymers are particularly preferred. When a catalyst for promoting the oxidization curing reaction or a metal drier is used together, the advantageous effects may be enhanced. Examples of the catalyst or metal drier include metal salts such as cobalt naphthenate, lead naphthenate, zirconium naphthenate, cobalt octanoate, zirconium octanonate and the like; and amine compounds and the like. The use amount of the oxygen curable material is preferably from 0.1 to 20 parts by weight, more preferably 0.5 to 10 parts by weight for 100 parts by weight of the organic polymer(s) (A) having a reactive silicon group. If the use amount is less than 0.1 part by weight, an improvement in pollution resistance is insufficient. If the amount is more than 20 parts by weight, the tensile characteristic or the like of the cured product tends to be damaged. As described in JP-A-3-160053, it is desired to use the oxygen curable material together with the photo-curable material.

An antioxidant (age resistor) can be used in the composition of the present invention. When the antioxidant is used, the heat resistance of the cured product can be enhanced. Examples of the antioxidant include hindered phenols, monophenols, bisphenols, and polyphenols. Particularly preferred are hindered phenols. Similarly, the following can also be used: a hindered amine photostabilizer named TINUVIN 622LD, TINUVIN 144, CHIMASSORB 944LD, or CHIMASSORB 119FL (which is manufactured by Ciba Specialty Chemicals Inc.); MARK LA-57, MARK LA-62, MARK LA-67, MARK LA-63, or MARK LA-68 (which is manufactured by Asashi Denka Kogyo K.K.); or SANOL LS-770, SANOL LS-765, SANOL LS-292, SANOL LS-2626, SANOL LS-1114, or SANOL LS-744 (which is manufactured by Sankyo Co., Ltd.). Specific examples of the antioxidant are described in JP-A-4-283259 and 9-194731 also. The use amount of the antioxidant is preferably from 0.1 to 10 parts by weight, more preferably from 0.2 to 5 parts by weight for 100 parts by weight of the organic polymer(s) (A) having a reactive silicon group.

A photostabilizer can be used in the composition of the present invention. The use of the photostabilizer makes it possible to prevent the cured product form being deteriorated by photo-oxidation. Examples of the photostabilizer include benztriazole compounds, hindered amine compounds, benzoate compounds and the like. Particularly preferred are hindered amine compounds. The use amount of the photostabilizer is preferably from 0.1 to 10 parts by weight, more preferably from 0.2 to 5 parts by weight for 100 parts by weight of the organic polymer(s) (A) having a reactive silicon group. Specific examples of the photostabilizer are described in JP-A-9-194731 also.

In the case of using the photocurable material, in particular, an unsaturated acrylic compound together in the composition of the present invention, it is preferred to use a tertiary-amine-containing hindered amine photostabilizer as a hindered amine photostabilizer, as described in JP-A-5-70531, in order to improve the storage stability of the composition. Examples of the tertiary-amine-containing hindered amine photostabilizer include photostabilizers named TINUVIN 622LD, TINUVIN 144, and CHIMASSORB 119FL (each manufactured by Ciba Specialty Chemicals Inc.); MARK LA-57, MARK LA-62, MARK LA-67, and MARK LA-63 (each manufactured by Asashi Denka Kogyo K.K.); and SANOL LS-765, SANOL LS-292, SANOL LS-2626, SANOL LS-1114, SANOL LS-744 (each manufactured by Sankyo Co., Ltd.) and the like.

An ultraviolet absorber can be used in the composition of the present invention. The use of the ultraviolet absorber makes it possible to enhance the surface weather resistance of the cured product. Examples of the ultra violet absorber include benzophenone compounds, benzotriazole compounds, salicylate compounds, substituted tolyl compounds, metal chelate compounds and the like. Particularly preferred are benzotriazole compounds. The use amount of the ultraviolet absorber is preferably from 0.1 to 10 parts by weight, more preferably from 0.2 to 5 parts by weight for 100 parts by weight of the organic polymer(s) (A) having a reactive silicon group. It is preferred to use a phenolic or hindered phenolic antioxidant with a hindered amine photostabilizer, and a benzotriazole ultraviolet absorber together.

An epoxy resin can be added to the composition of the present invention. The composition to which the epoxy resin is added is particularly preferred as an adhesive, in particular, as an adhesive for outer wall tiles. Examples of the epoxy resin include epichlorohydrin-bisphenol A epoxy resin, epichlorohydrin-bisphenol F epoxy resin, glycidyl ether of tetrabromobisphenol A, other flame retardant epoxy resins, novolak epoxy resin, hydrogenated bisphenol A epoxy resin, glycidyl ether type epoxy resin of a bisphenol A propylene oxide adduct, glycidyl etherester type epoxy resin of p-oxybenzoic acid, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycerin, other glycidyl ethers of polyhydric alcohol, hydantoin type epoxy resin, petroleum resin, and other epoxidized unsaturated polymers. However, the epoxy resin is not limited thereto, and any epoxy resin that is ordinarily used can be used. Preferred is an epoxy resin having, in the molecule thereof, at least two epoxy groups since a high reactivity is exhibited when the resin is cured and a three-dimensional network structure is easily formed in the cured product. More preferred is bisphenol A epoxy resin, novolak epoxy resin or the like. The ratio by weight of the used epoxy resin to the organic polymer(s) (A) having a reactive silicon group ranges from 100/1 to 1/100. If the ratio of the (A) to the epoxy resin is less than 1/100, the impact strength of the epoxy resin cured product or the toughness-improving effect thereof is not easily obtained. If the ratio of the (A)/to the epoxy resin is more than 100/1, the strength of the organic polymer cured product becomes insufficient. A preferred use ratio there between is not decided without reservation since the ratio is varied in accordance with the usage of the curable resin composition, or the like. In the case of improving, for example, the impact resistance, flexibility, toughness, peel strength or the like of the epoxy resin cured product, the component (A) is/are used preferably in an amount of 1 to 100 parts by weight, more preferably in an amount of 5 to 100 parts by weight for 100 parts by weight of the epoxy resin. In the case of improving the strength of the cured product of the component(s) (A), the epoxy resin is used preferably in an amount of 1 to 200 parts by weight, more preferably in an amount of 5 to 100 parts by weight for 100 parts by weight of the component (A).

In the case of the addition of the epoxy resin, a curing agent for curing the epoxy resin can be naturally be used together in the curable composition of the present invention. The epoxy resin curing agent which can be used is not particularly limited, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyether and the like; tertiary amines such as 2,4,6-tris(dimethylaminomethyl)phenol and tripropylamine, and salts of these tertiary amines; polyamide resins; imidazoles; dicyandiamines; trifluoroboron complex compounds; carboxylic anhydrides such as phthalic anhydride, hexahydrophthalic anhydride, tetrahydrophthalic anhydride, dodecylsuccinic anhydride, pyromellitic anhydride, chlorendic anhydride and the like; alcohols; phenols; carboxylic acids; and diketone complex compounds of aluminum or zirconium, and the like. However, the curing agent is not limited thereto. The above-mentioned curing agents may be used alone or in combination of two or more thereof.

When the epoxy resin curing agent is used, the use amount thereof ranges from 0.1 to 300 parts by weight for 100 parts by weight of the epoxy resin.

A ketimine can be used as the epoxy resin curing agent. The ketimine is stably present in a state that there is no water content, and is dissolved into a primary amine and a ketone by water content. The resultant primary amine becomes a curing agent for epoxy resin which can be cured at room temperature. When the ketimine is used, a one-part type composition can be obtained. Such a ketimine compound can be obtained by condensation reaction between an amine compound and a carbonyl compound.

In order to synthesize the ketimine, a known amine compound and a known carbonyl compound may be used. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phneylenediamine, p,p'-biphenylenediamine or the like; a polyhydric amine such as 1,2,3-triaminopropane, triaminobenzene, tris(2-aminoethyl)amine, tetrakis(aminomethyl)methane or the like; a polyalkylenepolyamine such as diethylenetriamine, triethylenetriamine, tetraethylenepentamine or the like; a polyoxyalkylene polyamine; an aminosilane such as γ-aminopropyltriethoxysilane, N-(β-aminoethyl)-γ-aminopropyltrimethoxysilane, N-(β-aminoethyl)-γ-aminopropylmethyldimethoxysilane; or the like. As the carbonyl compound, the following can be used: an aldehyde such as acetoaldehyde, propionaldehyde, n-butylaldehyde, isobutylaldehyde, diethylacetoaldehyde, glyoxal, benzaldehyde or the like; a cyclic ketone such as cyclopentanone, trimethylcyclopentanone, cyclohexanone, trimethylcyclohexanone or the like; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone or the like; a β-dicarbonyl compound such as acetylacetone, methyl acetoacetate, ethyl acetoacetate, dimethyl malonate, diethyl malonate, methylethyl malonate, dibenzoylmethane; or the like.

When an imino group is present in the ketimine, the imino group may be caused to react with styrene oxide, a glycidyl ether such as butyl glycidyl ether allyl glycidyl ether or the like, a glycidyl ester, or the like. The above-mentioned ketimines may be used alone or in combination of two or more thereof. The use amount thereof is from 1 to 100 parts by weight for 100 parts by weight of the epoxy resin, and is varied in accordance with the kind of the epoxy resin and that of the ketimine.

A flame retardant may be added to the curable composition of the present invention, examples of the retardant including a phosphorus-containing plasticizer such as ammonium polyphosphate, tricresyl phosphate or the like; aluminum hydroxide, magnesium hydroxide, or thermally expandable graphite or the like. These flame retardants may be used alone or in combination of two or more thereof.

The flame retardant is used in an amount of 5 to 200 parts by mass, preferably 10 to 100 parts by mass for 100 parts by weight of the component (A).

If necessary, various additives may be added to the curable composition of the present invention in order to adjust various physical properties of the curable composition or the cured product. Examples of the additives include a curability adjustor, a radical inhibitor, a metal inactivating agent, an ozone deterioration preventive, a phosphorus-containing peroxide decomposer, a lubricant, a pigment, a foaming agent, an ant preventive, and an antifungal agent. These additives may be used alone or in combination of two or more thereof. Specific examples of additives other than the specific examples of the additives described in the specification are described in JP-B-4-69659 and 7-108928, and JP-A-63-254149, 64-22904 and 2001-72854, and other publications.

The curable composition of the present invention can be prepared into a one component form, wherein all blend components are beforehand blended, air-tightly sealed up and stored, and after the resultant blend is actually used, the blend is cured with moisture in the air. Alternatively, the composition can be prepared into a two-component form, wherein a curing catalyst, a filler, a plasticizer, water and other components are separately blended with each other as a curing agent, and this blend and a polymer composition are mixed before used. From the viewpoint of workability, the one-part form is preferred.

In the case that the curable composition is in a one component form, all of the blend components are beforehand blended with each other; therefore, it is preferred to use the blend components which contain water content after the components are dehydrated and dried in advance, or dehydrate the composition by pressure-reduction when the components are blended and kneaded. In the case that the curable composition is in a two-component form, it is unnecessary to blend a curing catalyst with the main agent containing the polymer(s) having a reactive silicon group; therefore, it is hardly feared that the blend components are gelatinized even if the components contain a certain amount of water content. However, in the case that the composition is required to have storage stability for a long term, the composition is preferably dehydrated and dried. Preferred examples of the method for the dehydration and drying include a heating drying method when the composition is in the form of a solid such as powder; and a pressure-reducing dehydrating method or a dehydrating method using synthetic zeolite, activated alumina, silica gel, caustic lime, magnesium oxide or the like when the composition is in a liquid form. It is allowable to incorporate a small amount of an isocyanate compound into the composition to cause the isocyanate group to react with water, thereby attaining dehydration, or to incorporate an oxazolidine compound such as 3-ethyl-2-methyl-2-(3-methylbutyl)-1,3-oxazolidine or the like to cause the compound to react with water, thereby attaining dehydration. By the addition of the following compound besides this dehydration drying method, the storage stability is made better by adding the following compound: a lower alcohol such as methanol or ethanol; or an alkoxysilane compound such as n-propyltrimethoxysilane, vinyltrimethoxysialne, vinylmethyldimethoxysilane, methyl silicate, ethyl silicate, γ-mercaptopropylmethyldimethoxysilane, γ-mercaptopropylmethyldiethoxysilane or the like.

The use amount of the dehydrating agent, in particular, a silicon compound reactive with water, such as vinyltrimethoxysilane or the like, is preferably from 0.1 to 20 parts by weight, more preferably from 0.5 to 10 parts by weight for 100 parts by weight of the organic polymer(s) (A) having a reactive silicon group.

The method for preparing the curable composition of the present invention is not particularly limited, and a usual method is adopted, an example of the method being a method of blending the above-mentioned components with each other, then using a mixer, a roll, a kneader or the like to knead the blend at normal temperature or while the blend is heated, or a method of using a small amount of an appropriate solvent to dissolve the above-mentioned components therein, and then mixing the components, or other methods.

When the curable composition of the present invention is exposed to the atmosphere, the composition forms a three-dimensional network structure by action of water, so as to be cured into a solid having rubber-like elasticity.

The curable composition of the present invention can be used for a binder, a sealing agent for a building, ship, car, road or the like, an adhesive, a mold or pattern-forming material, a vibration isolating material, a vibration reducing material, a soundproof material, a foaming material, a paint, a spraying material, and so on. The composition is more preferably used as a sealant or an adhesive, out of the above-mentioned materials, since the cured product obtained by curing the curable composition of the present invention is excellent in flexibility and adhesiveness.

The curable composition can be used for various articles, such as electrical/electronic part materials such as a solar cell rear face sealant and the like, electrically insulating materials such as an insulating coating material for electric wires/cables and the like, elastic adhesives, contact-type adhesives, spray type sealants, crack repairing materials, tile-laying adhesives, powdery paints, casting materials, rubber materials for medical treatment, adhesives for medical treatment, medical instrument sealants, food wrapping materials, joint sealants for outer packaging materials such as a siding board and the like, coating materials, primers, electromagnetic-wave-shielding electroconductive materials, thermally conductive materials, hot melt materials, electrical and electronic potting agents, films, gaskets, various molding materials, rust resisting/waterproof sealants for an end face (cut portion) of net-incorporated glass or laminated glass, and liquid sealants used in automobile parts, electrical parts, or various mechanical parts. Furthermore, the curable composition can adhere closely to various substrates such as glass, ceramic, wood, metal, resin molded product substrates and the like by itself or by aid of a primer; therefore, the curable composition can also be used as various types of sealing compositions or adhesive compositions. Moreover, the curable composition of the present invention can be used as an adhesive for interior panels, an adhesive for exterior panels, a tile-laying adhesive, a stone-material-laying adhesive, a ceiling finishing adhesive, a floor finishing adhesive, a wall finishing adhesive, an adhesive for automobile panels, an electrical/electronic/precision instrument fabricating adhesive, a direct grading sealants, a sealant for double glazing, a sealant for the SSG method, or a sealant for working joints of a building.

EXAMPLES

The present invention will be specifically described by the following working examples and comparative examples; however, the present invention is not limited to these examples.

Synthesis Example 1

Polyoxypropylene diol having a molecular weight of about 2,000 was used as an initiator to polymerize propylene oxide in the presence of a zinc hexacyanocobalate glyme catalyst to yield a polypropylene oxide having at its terminals hydroxyl groups and having a number-average molecular weight of about 25,500, which was a molecular weight in terms of polystyrene measured by use of an HLC-8120 GPC manufactured by Tosoh Corp. as a liquid-feeding system, a TSK-GEL H type column manufactured by Tosoh Corp., and THF as a solvent. Subsequently, a solution of NaOMe in methanol was added thereto at an equivalent 1.2 times the amount of the hydroxyl groups of this hydroxyl-group-terminated polypropylene oxide, and methanol was distilled off. Furthermore, allyl chloride was added thereto so as to convert the hydroxyl groups at the terminals to allyl groups. Unreacted allyl chloride was volatilized and removed under reduced pressure. Into 100 parts by weight of the resultant crude allyl-group-terminated polypropylene oxide were incorporated 300 parts by weight of n-hexane and 300 parts by weight of water, and then the mixture was stirred. Water was then removed therefrom by centrifugal separation. Furthermore, 300 parts by weight of water were incorporated into the resultant solution in hexane, and then the mixture was stirred. Water was again removed therefrom by centrifugal separation, and then hexane was volatilized and removed under reduced pressure. This way gave an allyl-group-terminated bifunctional polypropylene oxide (P-1) having a number-average molecular weight of about 25,500.

At 90° C., 150 ppm of a solution of a platinum vinylsiloxane complex, the platinum content by percentage being 3% by weight, was used as a catalyst to cause 1.1 parts by weight of trimethoxysilane to react with 100 parts by weight of the resultant allyl-group-terminated polypropylene oxide (P-1) for 2 hours, so as to yield a trimethoxysilyl-group-terminated polyoxypropylene polymer (A-1). According to measurement by $^1$H-NMR (in a $CDCl_3$ solvent by use of a JNM-LA400 manufactured by JEOL Ltd.), the number of the trimethoxysilyl groups at the terminals was 1.3 per molecule on average.

Synthesis Example 2

Instead of the silane compound in Synthesis Example 1, 0.9 parts by weight of methyldimethoxysilane was used, and the same operation as in Synthesis Example 1 was performed to yield a methyldimethoxysilyl-group-terminated polyoxypropylene based polymer (A-2). The average number of the methyldimethoxysilyl groups at the terminals was 1.3 per molecule according to measurement by $^1$H-NMR (measurement made in $CDCl_3$ solvent by use of a JNM-LA400 manufactured by JEOL Ltd.).

Examples 1 to 4, and Comparative Example 1

A polymer (A-1) having a silicon group wherein three hydrolyzable groups were bonded per silicon atom was mixed with a polymer (A-2) having a silicon group wherein two hydrolyzable groups were bonded per silicon atom at each ratio shown in Table 1. Under the condition of a constant temperature of 23° C. and a constant humidity condition of 50%, an adhesion-imparting agent and an amine compound (B1) were added to the polymer mixture at each ratio shown in Table 1. A spatula was used to knead the mixed components for 2 minutes, and then the resultant was allowed to stand still. This time was defined as the curing start time, and the curing time was measured. At intervals of 1 minute, a tip of the spatula was brought into contact with the mixture surface. The time until the mixture came not to adhere onto the spatula was defined as the skin formation time. The results are shown in Table 1.

TABLE 1

|  |  |  | Examples | | | | Comparative Example |
|---|---|---|---|---|---|---|---|
| Composition (parts by weight) | | | 1 | 2 | 3 | 4 | 1 |
| Organic polymer having a reactive-silicon-containing group | A-1 | | 100 | 80 | 50 | 20 | |
| | A-2 | | | 20 | 50 | 80 | 100 |
| Adhesion-imparting agent | A1110[(1)] | Nippon Unicar Co., Ltd. | 3 | 3 | 3 | 3 | 3 |
| Amine compound (B1) | DBU[(2)] | San-Apro Co., Ltd. | 2.5 | 2.5 | 2.5 | 2.5 | 2.5 |
| Curability | Skin formation time | (minutes) | 84 | 91 | 143 | 210 | >24 hours |

[(1)]$H_2NC_3H_6Si(OMe)_3$
[(2)]1,8-Diazabicyclo[5.4.0]-7-undecene

When DBU was used as a silanol condensation catalyst, the organic polymer was not cured even after one day in the case of using, as the organic polymer, only the polymer (A-2) having a silicon group wherein two hydrolyzable groups were bonded per silicon atom, as in Comparative Example 1. On the other hand, in the case of using the polymer (A-1) having a silicon group wherein three hydrolyzable groups were bonded per silicon atom as in Examples 1 to 4, good curability was exhibited.

Examples 5 to 8, and Comparative Examples 2 to 5

An organic polymer (A-1 or A-2) having a reactive-silicon-containing group and fillers were mixed and kneaded at each ratio shown in Table 2 by use of a three-axis roll. The resultant was used as a main agent.

Under the condition of a constant temperature of 23° C. and a constant humidity of 50%, one out of various amine compounds (B1) shown in Table 2 was added to the main agent, and then a spatula was used to mix and knead these components for 2 minutes. Thereafter, the blend was sufficiently degassed. The surface of the blend was made flat to set thickness of the blend to 3 mm or more. This time was defined as the curing start time, and the curing time was measured. At intervals of 1 minute, a tip of the spatula was brought into contact with the mixture surface. The time until the mixture came not to adhere onto the spatula was defined as the skin formation time. The results are shown in Table 2.

TABLE 2

|  |  |  | Examples | | | | Comparative Examples | | | |
|---|---|---|---|---|---|---|---|---|---|---|
| Composition (parts by weight) | | | 5 | 6 | 7 | 8 | 2 | 3 | 4 | 5 |
| Organic polymer having a reactive-silicon-containing group | A-1 | | 100 | 100 | 100 | 100 | | | | |
| | A-2 | | | | | | 100 | 100 | 100 | 100 |
| Fillers | Hakuenka CCR[(1)] | Shiraishi Industrial, Co., Ltd. | 50 | 50 | 50 | 50 | 50 | 50 | 50 | 50 |
| | Whiton SB[(2)] | Shiraishi Calcium Co., Ltd. | 50 | 50 | 50 | 50 | 50 | 50 | 50 | 50 |
| Amine compound (B1) | DBU[(3)] | San-Apro Co., Ltd. | 5 | | | | 5 | | | |
| | 1,3-Propanediamine | Wako Pure Chemical Industries, Co., Ltd. | | 2.8 | | | | 2.8 | | |
| | Diethylene-triamine | Wako Pure Chemical Industries, Co., Ltd. | | | 4 | | | | 4 | |
| | Octylamine | Wako Pure Chemical Industries, Co., Ltd. | | | | 5 | | | | 5 |
| Curability | Skin formation time | (minutes) | 20 | 50 | 50 | 480 | >24 hours | >24 hours | >24 hours | >24 hours |

[(1)]Colloidal calcium carbonate
[(2)]Ground calcium carbonate
[(3)]1,8-Diazabicyclo[5.4.0]-7-undecene In the case of using any one of the amine compounds (B1) shown in Table 2, the organic polymer having a reactive-silicon-containing group was not cured even after one day when the organic polymer was the polymer (A-2) having a silicon group wherein two hydrolyzable groups were bonded per silicon atom, as in Comparative Examples. On the other hand, in the case of using the polymer (A-1) having a silicon group wherein three hydrolyzable groups were bonded per silicon atom, a good curability was exhibited.

Examples 9 to 11, and Comparative Examples 6 to 8

Under the condition of a constant temperature of 23° C. and a constant humidity of 50%, in accordance with each formulation shown in Table 3, an adhesion-imparting agent and one out of various amine compounds (B1) were added to the main agent. The skin formation time was then measured in the same way as described above. The results are shown in Table 3.

TABLE 3

| Composition (parts by weight) | | | Examples | | | Comparative Examples | | |
|---|---|---|---|---|---|---|---|---|
| | | | 9 | 10 | 11 | 6 | 7 | 8 |
| Organic polymer having a reactive-silicon-containing group | | A-1 | 100 | 100 | 100 | | | |
| | | A-2 | | | | 100 | 100 | 100 |
| Fillers | Hakuenka CCR[1] | Shiraishi Industrial, Co., Ltd. | 50 | 50 | 50 | 50 | 50 | 50 |
| | Whiton SB[2] | Shiraishi Calcium Co., Ltd. | 50 | 50 | 50 | 50 | 50 | 50 |
| Adhesion-imparting agent | A-1110[3] | Nippon Unicar Co., Ltd. | 4 | 4 | 4 | 4 | 4 | 4 |
| Amine compound (B1) | DBU[4] | San-Apro Co., Ltd. | 2.3 | | | 2.3 | | |
| | 2-Aminoethanol | Wako Pure Chemical Industries, Co., Ltd. | | 2.3 | | | 2.3 | |
| | Diethylene-triamine | Wako Pure Chemical Industries, Co., Ltd. | | | 4 | | | 4 |
| Curability | Skin formation time | (minutes) | 37 | 70 | 50 | >24 hours | >24 hours | >24 hours |

[1] Colloidal calcium carbonate
[2] Ground calcium carbonate
[3] $H_2NC_3H_6Si(OMe)_3$
[4] 1,8-Diazabicyclo[5.4.0]-7-undecene In the case of using any one of the amine compounds (B1) shown in Table 3, the organic polymer having a reactive-silicon-containing group was not cured even after one day when the organic polymer was the polymer (A-2) having a silicon group wherein two hydrolyzable groups were bonded per silicon atom, as in Comparative Examples. On the other hand, in the case of using the polymer (A-1) having a silicon group wherein three hydrolyzable groups were bonded per silicon atom, a good curability was exhibited.

Examples 12 to 17, and Comparative Examples 9 to 12

Under the condition of a constant temperature of 23° C. and a constant humidity of 50%, in accordance with each formulation shown in Table 4, an adhesion-imparting agent, one out of various amine compounds (B1), and a carboxylic acid (B2) were added to the main agent. The skin formation time was then measured in the same way as described above. The results are shown in Table 4.

TABLE 4

| Composition (parts by weight) | | | Examples | | | | | | Comparative Examples | | | |
|---|---|---|---|---|---|---|---|---|---|---|---|---|
| | | | 12 | 13 | 14 | 15 | 16 | 17 | 9 | 10 | 11 | 12 |
| Organic polymer (A) | | A-1 | 100 | 100 | 100 | 100 | 100 | 100 | 100 | 100 | 100 | 100 |
| Fillers | Hakuenka CCR[1] | Shiraishi Industrial, Co., Ltd. | 50 | 50 | 50 | 50 | 50 | 50 | 50 | 50 | 50 | 50 |
| | Whiton SB[2] | Shiraishi Calcium Co., Ltd. | 50 | 50 | 50 | 50 | 50 | 50 | 50 | 50 | 50 | 50 |
| Adhesion-imparting agent | A-1110[3] | Nippon Unicar Co., Ltd. | 3 | | 3 | | 3 | 3 | 3 | | 3 | |
| Amine compound (B1) | DBU[4] | San-Apro Co., Ltd. | 2 | 2 | | | | | 0.5 | 0.5 | | |
| | 2-Aminoethanol | Wako Pure Chemical Industries, Co., Ltd. | | | 2.5 | 2.5 | | | | | | |
| | DBN[5] | San-Apro Co., Ltd. | | | | | | 1.63 | | | | |
| | 1-o-Tolylbiguanide | Tokyo Kasei Industrial Co., Ltd. | | | | | | | | | 2.51 | |

TABLE 4-continued

|  |  |  | Examples | | | | | | Comparative Examples | | | |
|---|---|---|---|---|---|---|---|---|---|---|---|---|
| Composition (parts by weight) | | | 12 | 13 | 14 | 15 | 16 | 17 | 9 | 10 | 11 | 12 |
|  | DEAPA[6] | Wako Pure Chemical Industries, Co., Ltd. |  |  |  |  |  |  |  |  | 0.5 | 0.5 |
| Carboxylic acid | Versatic 10[7] | Japan Epoxy Resins Co., Ltd. |  |  |  |  |  |  | 2.5 | 2.5 | 2.5 | 2.5 |
| Curability | Skin formation time | (minutes) | 21 | 21 | 21 | 34 | 45 | 40 | 220 | 80 | 250 | 18 |

[1]Colloidal calcium carbonate
[2]Ground calcium carbonate
[3]$H_2NC_3H_6Si(OMe)_3$
[4]1,8-Diazabicyclo[5.4.0]-7-undecene
[5]1,5-Diazabicyclo[4.3.0]-5-nonene
[6]3-Diethylaminopropylamine
[7]Neodecanoic acid In the case of using the catalyst made mainly of the carboxylic acid (B2) as in Comparative Examples, the curability was largely lowered by the addition of A1110 as an aminosilane. On the other hand, in the case of using only one of the amine compounds (B1) as a silanol condensation catalyst, a large fall in the curability by the addition of the aminosilane was not observed. When 2-aminoethanol was used, the curability was conversely improved.

Examples 18 to 20, and Comparative Examples 13 and 14

Under the condition of a constant temperature of 23° C. and a constant humidity of 50%, in accordance with each formulation shown in Table 5, an adhesion-imparting agent, one out of various amine compounds (B1), and a carboxylic acid were added to the main agent. The skin formation time was then measured in the same way as described above. Each of the blends was caused to adhere closely to an adhesion substrate (a glass, an anodized aluminum, a flexible PVC coating on steel plate, or an acrylic resin plate) to give a size 30 mm in length, 15 mm in width and 10 mm in thickness, and then the resultant was cured under the condition of a constant temperature of 23° C. and a constant humidity of 50% for 7 days. The adhesiveness thereof was evaluated in accordance with a 90-degree hand peel test. The evaluation of the adhesiveness was made by observing the breakdown state of the cured product. In the table, a product having an aggregation breakdown ratio of 90% or more, 50% or more and less than 90%, 10% or more and less than 50%, or less than 10% is represented by A, B, C or D, respectively. The results are shown in Table 5.

TABLE 5

|  |  |  | Examples | | | Comparative Examples | |
|---|---|---|---|---|---|---|---|
| Composition (parts by weight) | | | 18 | 19 | 20 | 13 | 14 |
| Organic polymer (A) | A-1 | | 100 | 100 | 100 | 100 | 100 |
| Fillers | Hakuenka CCR[1] | Shiraishi Industrial, Co., Ltd. | 50 | 50 | 50 | 50 | 50 |
|  | Whiton SB[2] | Shiraishi Calcium Co., Ltd. | 50 | 50 | 50 | 50 | 50 |
| Adhesion-imparting agent | A-1110[3] | Nippon Unicar Co., Ltd. | 4 | 4 | 4 | 4 | 4 |
| Amine compound (B1) | DBU[4] | San-Apro Co., Ltd. | 0.8 |  |  | 0.8 |  |
|  | 2-Aminoethanol | Wako Pure Chemical Industries, Co., Ltd. |  | 2.3 |  |  |  |
|  | N-Methylethylene-diamine | Shiraishi Industrial, Co., Ltd. |  |  | 2.9 |  |  |
|  | DEAPA[5] | Shiraishi Calcium Co., Ltd. |  |  |  |  | 0.5 |
| Carboxylic acid (B2) | Versatic 10[6] | Japan Epoxy Resins Co., Ltd. |  |  |  | 2.5 | 2.5 |
| Curability | Skin formation time | (minutes) | 120 | 70 | 37 | 80 | 60 |
| Adhesiveness | 90-Degree hand peel | Glass | A | A | A | D | D |
|  |  | Anodized | A | A | A | D | D |

TABLE 5-continued

|  |  | Examples | | | Comparative Examples | |
|---|---|---|---|---|---|---|
| Composition (parts by weight) | | 18 | 19 | 20 | 13 | 14 |
| | aluminum | | | | | |
| | Flexible PVC coating on steel plate | A | A | B | D | D |
| | Acrylic resin plate | A | A | A | D | D |

[1] Colloidal calcium carbonate
[2] Ground calcium carbonate
[3] $H_2NC_3H_6Si(OMe)_3$
[4] 1,8-Diazabicyclo[5.4.0]-7-undecene
[5] 3-Diethylaminopropylamine
[6] Neodecanoic acid In the case of using only one of the amine compounds (B1) as a silanol condensation catalyst as in Examples, a good adhesiveness onto any one of the adhesion substrates was exhibited. Conversely, in the case of using the catalyst made mainly of the carboxylic acid (B2), interface peel was caused for almost all of the substrates.

Examples 21 to 23, and Comparative Examples 15 to 17

Under the condition of a constant temperature of 23° C. and a constant humidity of 50%, in accordance with each formulation shown in Table 6, an adhesion-imparting agent, one out of various amine compounds (B1), and a carboxylic acid (B2) were added to the main agent. The skin formation time and the adhesiveness were then measured in the same way as described above. As the adhesion substrate, a flexible PVC coating on steel plate or an acrylic resin plate was used. The results are shown in Table 6.

TABLE 6

| Composition (parts by weight) | | | | Examples | | | Comparative Examples | | |
|---|---|---|---|---|---|---|---|---|---|
| | | | | 21 | 22 | 23 | 15 | 16 | 17 |
| Organic polymer (A) | | A-1 | | 100 | 100 | 100 | 100 | 100 | 100 |
| Fillers | Hakuenka CCR[1] | | Shiraishi Industrial, Co., Ltd. | 50 | 50 | 50 | 50 | 50 | 50 |
| | Whiton SB[2] | | Shiraishi Calcium Co., Ltd. | 50 | 50 | 50 | 50 | 50 | 50 |
| Adhesion-imparting agent | A-1110[3] | | Nippon Unicar Co., Ltd. | 3 | 3 | 3 | 3 | 3 | 3 |
| Amine compound (B1) | DBU[4] | | San-Apro Co., Ltd. | 2.5 | 2.5 | | 2.5 | 2.5 | |
| | 2-Aminoethanol | | Wako Pure Chemical Industries, Co., Ltd. | | | 2 | | | 2 |
| Carboxylic acid (B2) | Versatic 10[5] | | Japan Epoxy Resins Co., Ltd. | | 0.2 | | 0.35 | 1.5 | 1.41 |
| Curability | Skin formation time | (minutes) | | 22 | 18 | 21 | 14 | 20 | 14 |
| Adhesiveness | 90-Degree hand peel | Flexible PVC coating on steel plate | | A | B | A | D | D | D |
| | | Acrylic resin plate | | A | A | A | C | D | A |

[1] Colloidal calcium carbonate
[2] Ground calcium carbonate
[3] $H_2NC_3H_6Si(OMe)_3$
[4] 1,8-Diazabicyclo[5.4.0]-7-undecene
[5] Neodecanoic acid In the case of using DBU together with the carboxylic acid as a silanol condensation catalyst as in Example 22 and Comparative Examples 15 and 16, the curability was improved. However, it was observed that the adhesiveness became lower as the addition amount thereof became larger. In the case of using 2-aminoethanol as one of the amine compounds (B1), the adhesiveness was lowered by the addition of the carboxylic acid.

Examples 24 and 25

An organic polymer (A-1) was used as a component(s) (A), and in accordance with each formulation shown in Table 7, fillers, a dehydrating agent, an adhesion-imparting agent, and one of amine compounds (B1) as a curing catalyst were each weighed. A mixer was used to produce a one-part curable composition therefrom, and then the resultant was air-tightly put into an aluminum cartridge.

The curable composition was pushed out from the cartridge, and a spatula was used to fill the composition into a frame having a thickness of about 5 mm. The surface thereof was made into a flat form, and then the skin formation time was measured under the condition of a constant temperature of 23° C. and a constant humidity of 50% RH.

The one-part curable composition was pushed out to be caused to adhere closely to each of adhesion sbstrates (a glass, an anodized aluminum, a stainless steel plate, and an acrylic resin plate). The resultant was allowed to stand still for curing under the condition of a constant temperature of 23° C. and a constant humidity of 50% RH for 7 days, and then a 90-degree hand peel test was made. The breakdown state of the cured product was observed, and a cohesion failure ratio was measured. In the table, a product having an aggregation breakdown ratio of 100%, 50% or more and less than 100%, 10% or more and less than 50%, or less than 10% is represented by A, B, C or D, respectively.

The results are shown in Table 7.

TABLE 7

| Composition (parts by weight) | | | Examples | |
|---|---|---|---|---|
| | | | 24 | 25 |
| Organic polymer (A) | | A-1 | 100 | 100 |
| Fillers | Hakuenka CCR[(1)] | Shiraishi Industrial, Co., Ltd. | 50 | 50 |
| | Whiton SB[(2)] | Shiraishi Calcium Co., Ltd. | 50 | 50 |
| Dehydrating agent | A-171[(3)] | Nippon Unicar Co., Ltd. | 2 | 2 |
| Adhesion-imparting agent | A-1110[(4)] | Nippon Unicar Co., Ltd. | 3 | 3 |
| Amine compound (B1) | DBU[(5)] | San-Apro Co., Ltd. | 2.3 | |
| | N-Methyl-1,3-propanediamine | Wako Pure Chemical Industries, Co., Ltd. | | 3.4 |
| Curability | Skin formation time | (minutes) | 15 | 28 |
| Adhesiveness | 90-Degree hand peel | Glass | A | A |
| | | Anodized aluminum | A | A |
| | | Stainless steel plate | A | A |
| | | Acrylic resin plate | B | A |

[(1)]Colloidal calcium carbonate
[(2)]Ground calcium carbonate
[(3)]Vinyltrimethoxysilane
[(4)]$H_2NC_3H_6Si(OMe)_3$
[(5)]1,8-Diazabicyclo[5.4.0]-7-undecene As is shown in the table, the one-part curable compositions using one of the amine compounds (B1) as a curing catalyst each exhibited good curability, and exhibited very good adhesiveness onto the various substrates.

Synthesis Example 3

Polyoxypropylenediol having a molecular weight of about 2,000 was used as an initiator to polymerize propylene oxide with a zinc hexacyanocobaltate glyme complex catalyst to yield a polypropylene oxide (P-2) having a number-average molecular weight of 16,000 (the molecular weight in terms of polystyrene, measured by using an HLC-8120GPC manufactured by Tosoh Corp. as a liquid-feeding system, a TSK-GEL H type manufactured by Tosoh Corp. as a column, and THF as a solvent).

In the atmosphere of nitrogen, 3.3 parts by weight of isophorone diisocyanate (manufactured by Wako Pure Chemical Industries, Ltd.) were mixed with 100 parts by weight of the hydroxyl-group-terminated polypropylene oxide (P-2), and then the mixture was stirred. Thereto was added 50 ppm of a Neostan [transliteration] U-360 (dibutyltinbisisooctylthioglycolate, manufactured by Nitto Kasei Co., Ltd.), and then the components were caused to react at 90° C. for 2 hours to yield a urethane prepolymer (P-3). The NCO group content by percentage was measured on the basis of a JIS K 1603 standard. The content was 0.47%.

In the atmosphere of nitrogen, to 1000 g of the urethane prepolymer (P-3) was added 27.7 g of cyclohexylaminopropyltrimethoxysilane, and then the components were caused to react at 50° C. for 1 hour. Thereto was further added 1 mL of methanol, and further the solution was stirred at 50° C. for 1 hour. Thereafter, the pressure was reduced to remove unreacted methanol to yield a trimethoxysilyl-terminated polyurethane (A-3).

Synthesis Example 4

Instead of cyclohexylaminopropyltrimethoxysilane in Synthesis Example 3, 29.2 g of cyclohexylaminomethyltriethoxysilane was added, and the same operation was conducted to yield a triethoxysilyl-terminated polyurethane (A-4).

Example 26, and Comparative Example 18

In accordance with each formulation shown in Table 8, an organic polymer (A-3 or A-4) having a reactive-silicon-containing group, a dehydrating agent, and an amine compound (B1) were sufficiently mixed with each other until the mixture became homogeneous. The resultant was degassed by centrifugation, and then fractionized into glass containers. The mixtures were air-tightly stored. Immediately after the mixing, and after the storage at 23° C. for 7 days, the contents were each caused to flow into an ointment can lid. Under the condition of a constant temperature of 23° C. and a constant humidity of 50%, the skin formation time of each of the contents was measured. Before and after the storage, a change in the external appearance was observed. In the table, a mixture wherein no change was observed with the naked eye, or a mixture wherein a clear change such as gelatinization was observed is represented by A or B, respectively. The amount of the added curing catalyst was adjusted to give substantially the same skin formation time at the initial stage. The results are shown in Table 8.

TABLE 8

| Composition (parts by weight) | | | Example 26 | Comparative Example 18 |
|---|---|---|---|---|
| Organic polymer having a reactive-silicon-containing group | | A-3 | 100 | |
| | | A-4 | | 100 |
| Dehydrating agent | A-171[1] | Nippon Unicar Co., Ltd. | 3 | 3 |
| Amine compound (B1) | DBU[2] | San-Apro Co., Ltd. | 0.2 | 0.03 |
| Curability | Skin formation time (minutes) | At the initial stage | 15 | 18 |
| | | After storage at 23° C. for one week | 10 | Unable to be measured |
| Change in external appearance | | | A | B |

[1] vinyltrimethoxysilane
[2] 1,8-diazabicyclo[5.4.0]-7-undecene

In the case of using the organic polymer (A-4), wherein no carbon-carbon bond was interposed between the silicon atom in its reactive silicon group and its main chain as in Comparative Example, the content was gelatinized when the composition was stored. On the other hand, in the case of using the organic polymer (A-3), the content was not gelatinized after the composition was stored. Thus, the curability thereof was able to be evaluated. The curing rate was substantially equal to that at the initial stage.

Synthesis Example 5

Polyoxypropylenediol having a molecular weight of about 2,000 was used as an initiator to polymerize propylene oxide with a zinc hexacyanocobaltate glyme complex catalyst to yield a bifunctional polypropylene oxide having hydroxyl groups at its terminals and having a number-average molecular weight of about 25,500 (the molecular weight in terms of polystyrene, measured by using an HLC-8120GPC manufactured by Tosoh Corp. as a liquid-feeding system, a TSK-GEL H type manufactured by Tosoh Corp. as a column, and THF as a solvent).

To 100 parts by weight of this hydroxyl-group-terminated polymer were added 1.6 parts by weight of γ-isocyanate propyltrimethoxysilane, and the components were caused to react at 90° C. for 5 hours to yield a polyoxypropylene polymer (A-5) having at its terminals trimethoxysilyl groups, the number of which was 1.3 on average, and having amide segments (—NHCO—) at the γ positions of the terminal silyl groups.

Examples 27 to 28, and Comparative Example 19

Under the condition of a constant temperature of 23° C. and a constant humidity of 50%, in accordance with each formulation shown in Table 9, an organic polymer (A-1, A-2 or A-5) having a reactive-silicon-containing group, and an amine compound (B1) were added at each ratio shown in Table 9. A spatula was used to knead the mixture at 2 minutes, and then the mixture was allowed to stand still. This time was defined as the curing start time, and the curing time was measured. At intervals of 1 minute, a tip of the spatula was brought into contact with the mixture surface. The time until the mixture came not to adhere onto the spatula was defined as the skin formation time. The results are shown in Table 9.

TABLE 9

| Composition (parts by weight) | | | Examples 27 | 28 | Comparative Example 19 |
|---|---|---|---|---|---|
| Organic polymer having a reactive-silicon-containing group | | A-1 | 100 | | |
| | | A-5 | | 100 | |
| | | A-2 | | | 100 |
| Amine compound (B1) | 1-o-Tolylguanide | Tokyo Kasei Industrial Co., Ltd. | 5 | 5 | 5 |
| Curability | Skin formation time | (minutes) | 26 | 16 | >24 hours |

In the case of using any one of the amine compounds (B1) shown in Table 9, the organic polymer was not subjected to curing treatment even after one day when the polymer (A-2) having a silicon group wherein two hydrolyzable groups were bonded per silicon atom was used (Comparative Example 19). On the other hand, in the case of using the polymer (A-1 or A-5) having a silicon group wherein three hydrolyzable groups were bonded per silicon atom, a good curability was exhibited (Examples 27 to 28). In the case of using the polymer having amide segments at the γ positions of the terminal silyl groups, a particularly good curability was exhibited (Example 28).

What is claimed is:

1. A tin-free curable composition, comprising:
   (A) one or more organic polymers having a reactive-silicon-containing group, wherein a main chain skeleton of the one or more organic polymers is at least one polymer selected from the group consisting of polyoxyalkylene polymers, saturated hydrocarbon polymers, and (meth) acrylic acid ester polymers; and
   (B) a silanol condensation catalyst consisting of amine compound(s) (B1),
   wherein at least one part of the reactive-silicon-containing group(s) of the organic polymer(s) (A) is represented by the following general formula (I):

$$—(CR^2_2)_2—(SiR^1_{2-a}X_a)_m—SiX_3 \quad (1)$$

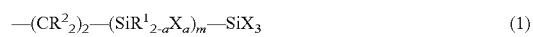

wherein,
   $R^1$s each independently represent a substituted or unsubstituted hydrocarbon group having 1 to 20 carbon atoms, or a triorganosiloxy group represented by $(R')_3SiO—$, wherein R's are each a substituted or unsubstituted hydrocarbon group having 1 to 20 carbon atoms, and R's, the number of which is 3, may be the same or different,
   $R^2$s are each independently a hydrogen atom, or a substituted or unsubstituted hydrocarbon group having 1 to 10 carbon atoms,
   Xs are each independently a hydroxyl group, or a hydrolyzable group,
   a is 0, 1 or 2, and
   m is 0 or an integer of 1 to 19, and
   the composition contains the amine compound(s) (B1) as the silanol condensation catalyst (B) in an amount of 0.001 to 20 parts by weight for 100 parts by weight of the organic polymer(s) (A).

2. A curable composition, comprising:
   (A) one or more organic polymers having a reactive-silicon-containing group; and
   (B) a silanol condensation catalyst consisting of amine compound(s) (B1) and carboxylic acid(s) (B2), wherein at least one part of the reactive-silicon-containing group(s) of the organic polymer(s) (A) is represented by the following general formula (I):

$$—(CR^2{}_2)_2—(SiR^1{}_{2-a}X_aO)_m—SiX_3 \quad (1)$$

wherein,
R$^1$s each independently represent a substituted or unsubstituted hydrocarbon group having 1 to 20 carbon atoms, or a triorganosiloxy group represented by (R')$_3$SiO—, wherein R's are each a substituted or unsubstituted hydrocarbon group having 1 to 20 carbon atoms, and R's, the number of which is 3, may be the same or different,
R$^2$s are each independently a hydrogen atom, or a substituted or unsubstituted hydrocarbon group having 1 to 10 carbon atoms,
Xs are each independently a hydroxyl group, or a hydrolyzable group,
a is 0, 1 or 2, and
m is 0 or an integer of 1 to 19, and
when the mol number of the amine compound(s) is regarded as 1, the ratio by mol of the total amount of the carboxylic acid(s) to the amount of the amine compound(s) is 0.07 to 0.1.

3. The tin-free curable composition according to claim 1, wherein X is an alkoxy group.

4. The tin-free curable composition according to claim 3, wherein the alkoxy group is a methoxy group.

5. The tin-free curable composition according to claim 1, wherein the ratio of the organic polymer having the group represented by the general formula (I) in the organic polymer(s) of the component (A) is 10% or more by weight.

6. The tin-free curable composition according to claim 1, wherein the polyoxyalkylene polymers are polyoxypropylene polymers.

7. The tin-free curable composition according to claim 1, wherein a silane coupling agent (C) is contained in an amount of 0.01 to 20 parts by weight for 100 parts by weight of the organic polymer(s) (A).

8. A one-part type curable composition, using the tin-free curable composition according to claim 1.

9. A sealant, using the tin-free curable composition according to claim 1.

10. An adhesive, using the tin-free curable composition according to claim 1.

11. The curable composition according to claim 2, wherein X is an alkoxy group.

12. The curable composition according to claim 11, wherein the alkoxy group is a methoxy group.

13. The curable composition according to claim 2, wherein the ratio of the organic polymer having the group represented by the general formula (I) in the organic polymer (s) of the component (A) is 10% or more by weight.

14. The curable composition according to claim 2, wherein the main chain skeleton of the organic polymer(s) of the component (A) is at least one polymer selected from the group consisting of polyoxyalkylene polymers, saturated hydrocarbon polymers, and (meth)acrylic acid ester polymers.

15. The curable composition according to claim 14, wherein the polyoxyalkylene polymers are polyoxypropylene polymers.

16. The curable composition according to claim 2, wherein the composition contains amine compound(s) (B1) as the silanol condensation catalyst (B) in an amount of 0.001 to 20 parts by weight for 100 parts by weight of the organic polymer(s) (A).

17. The curable composition according to claim 2, wherein a silane coupling agent (C) is contained in an amount of 0.01 to 20 parts by weight for 100 parts by weight of the organic polymer(s) (A).

18. A one-part type curable composition, using the curable composition according to claim 2.

19. A sealant, using the curable composition according to claim 2.

20. An adhesive, using the curable composition according to claim 2.

21. The curable composition according to claim 2, further comprising a supplementary curing catalyst other than amine compound(s) (B1) and carboxylic acid(s) (B2) in such a degree not to lower the advantageous effects provided by the amine compound(s) (B1) and the carboxylic acid(s) (B2) to the curable composition.

22. The curable composition according to claim 21, wherein the supplementary curing catalyst is selected from the group consisting of derivatives of the carboxylic acid metal salts, titanium compounds, organic tin compounds, aluminum compounds, zirconium compounds, metal alkoxides, organic acidic phosphates, organic sulfonic acids and inorganic acids.

23. The tin-free curable composition according to claim 1, wherein the amine compound(s) (B1) comprise at least one selected from the group consisting of 1,8-diazabicyclo(5,4,0)undecene-7,1,5-diazabicyclo(4,3,0)nonene-5, an aryl-substituted biguanide, an amine compound wherein the pKa value of the conjugate acid thereof is 11 or more, and an amine compound represented by the following general formula (12)

$$R^{11}{}_dYR^{12}NHR^{13} \quad (12)$$

wherein Y is one selected from O, N, S and P; when Y is O or S, d is 1 and when Y is N or P, d is 2;
R$^{11}$s are each a hydrogen atom, or a substituted or unsubstituted hydrocarbon group having 1 to 20 carbon atoms; when the number of R$^{11}$s is two, R$^{11}$s may be the same or different;
R$^{12}$ is a substituted or unsubstituted bivalent hydrocarbon group having 1 to 10 carbon atoms; and
R$^{13}$ is a hydrogen atom or a methyl group.

24. The curable composition according to claim 2, wherein the amine compound(s) (B1) comprise at least one selected from the group consisting of 1,8-diazabicyclo(5,4,0)undecene-7,1,5-diazabicyclo(4,3,0)nonene-5, an aryl-substituted biguanide, an amine compound wherein the pKa value of the conjugate acid thereof is 11 or more, and an amine compound represented by the following general formula (12)

$$R^{11}{}_dYR^{12}NHR^{13} \quad (12)$$

wherein Y is one selected from O, N, S and P; when Y is O or S, d is 1 and when Y is N or P, d is 2;
R$^{11}$s are each a hydrogen atom, or a substituted or unsubstituted hydrocarbon group having 1 to 20 carbon atoms; when the number of R$^{11}$s is two, R$^{11}$s may be the same or different;
R$^{12}$ is a substituted or unsubstituted bivalent hydrocarbon group having 1 to 10 carbon atoms; and
R$^{13}$ is a hydrogen atom or a methyl group.

25. The tin-free curable composition according to claim 1, wherein the main chain skeleton of the component(s) (A) contains an amide segment.

26. The tin-free curable composition according to claim 25, wherein component (B) includes an aryl-substituted biguanide as the silanol condensation catalyst.

* * * * *